(12) United States Patent
Sonoda

(10) Patent No.: US 9,432,599 B2
(45) Date of Patent: Aug. 30, 2016

(54) IMAGING DEVICE, IMAGING APPARATUS, SEMICONDUCTOR DEVICE AND READOUT METHOD

(71) Applicant: Sony Corporation, Tokyo (JP)

(72) Inventor: Shuuji Sonoda, Kumamoto (JP)

(73) Assignee: Sony Corporation, Tokyo (JP)

( * ) Notice: Subject to any disclaimer, the term of this patent is extended or adjusted under 35 U.S.C. 154(b) by 215 days.

(21) Appl. No.: 14/050,396

(22) Filed: Oct. 10, 2013

(65) Prior Publication Data

US 2014/0132807 A1 May 15, 2014

(30) Foreign Application Priority Data

Nov. 13, 2012 (JP) ................................. 2012-249265

(51) Int. Cl.
*H04N 5/361* (2011.01)
*H04N 5/374* (2011.01)
*H04N 5/357* (2011.01)
*H04N 5/378* (2011.01)

(52) U.S. Cl.
CPC ............ *H04N 5/361* (2013.01); *H04N 5/3575* (2013.01); *H04N 5/378* (2013.01); *H04N 5/3742* (2013.01)

(58) Field of Classification Search
CPC .... H04N 5/361; H04N 5/3575; H04N 5/378; H04N 5/3742
See application file for complete search history.

(56) References Cited

U.S. PATENT DOCUMENTS

| 5,877,715 A * | 3/1999 | Gowda et al. ................ 341/122 |
| 7,129,883 B2 * | 10/2006 | Muramatsu et al. ......... 341/164 |
| 7,796,174 B1 * | 9/2010 | Harwit et al. ................ 348/311 |
| 2008/0224913 A1 * | 9/2008 | Suzuki et al. ................ 341/155 |
| 2008/0258047 A1 * | 10/2008 | Sakakibara et al. ...... 250/214 C |
| 2009/0321799 A1 * | 12/2009 | Velichko ............ H04N 5/35572 257/292 |
| 2010/0253560 A1 * | 10/2010 | Kudo ............................ 341/143 |
| 2012/0132786 A1 * | 5/2012 | Mori et al. ................. 250/208.1 |

FOREIGN PATENT DOCUMENTS

JP 2006-033452 A 2/2006

* cited by examiner

*Primary Examiner* — Roberto Velez
*Assistant Examiner* — Tuan Le
(74) *Attorney, Agent, or Firm* — Chip Law Group

(57) ABSTRACT

An imaging device includes a readout unit which reads out an amount of charge accumulated in a floating diffusion that accumulates a charge transmitted from a light receiving unit that photoelectrically converts incident light as a signal level; a readout control unit which controls the readout unit to perform, a plurality of times, a readout operation to read out the amount of charge of a P-phase and a D-phase accumulated in the floating diffusion; and a calculation unit which is controlled by the readout control unit and obtains differences between the signal levels which are obtained using the readout operation that is performed a plurality of times.

19 Claims, 14 Drawing Sheets

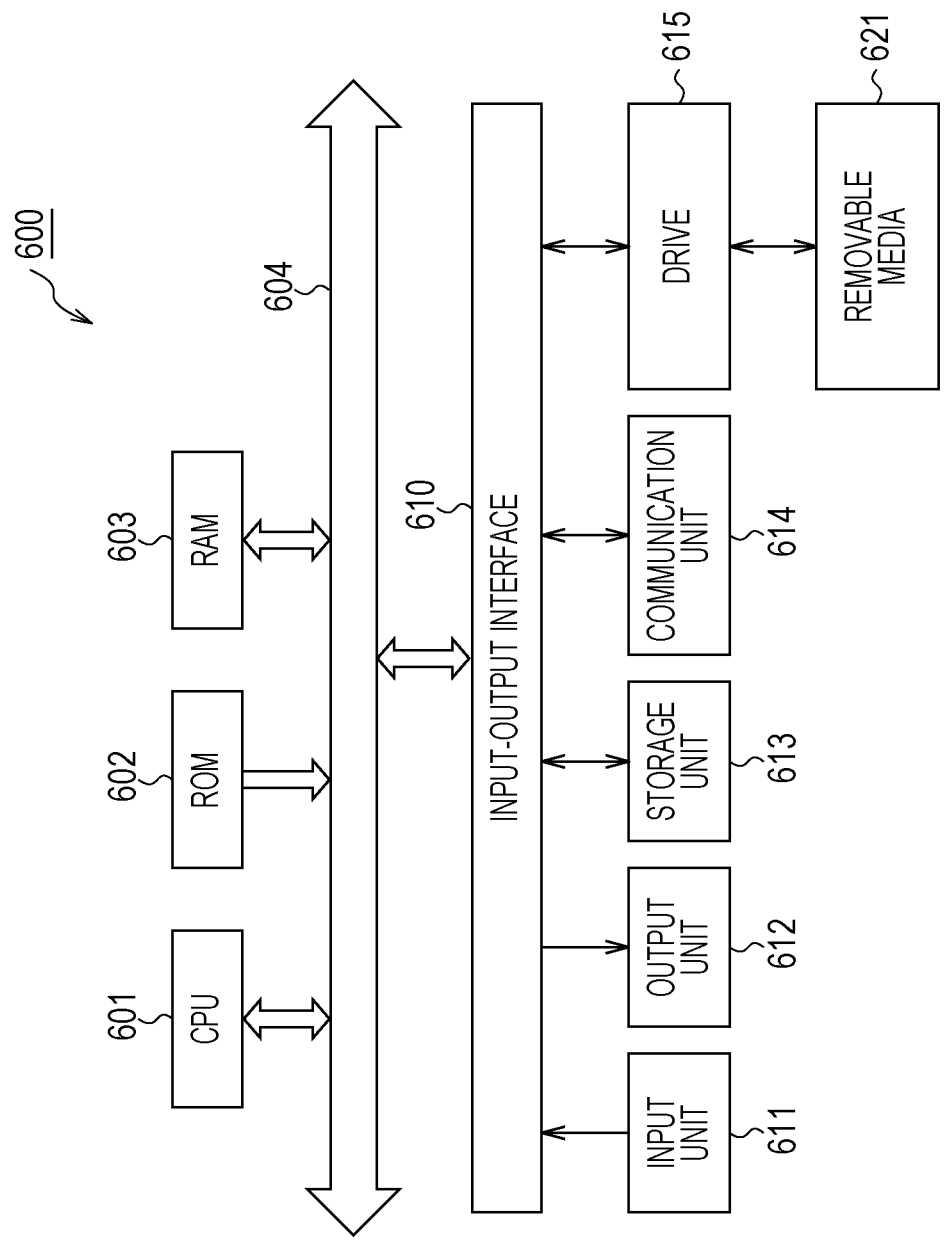

IMAGING DEVICE, IMAGING APPARATUS, SEMICONDUCTOR DEVICE AND READOUT METHOD

CROSS REFERENCE TO RELATED APPLICATIONS

This application claims the benefit of Japanese Priority Patent Application JP 2012-249265 filed Nov. 13, 2012, the entire contents of which are incorporated herein by reference.

BACKGROUND

The present disclosure relates to an imaging device, an imaging apparatus, a semiconductor device and a readout method. In particular, the present disclosure relates to an imaging device, an imaging apparatus, a semiconductor device and a readout method which are capable of suppressing a dark current component of a pixel signal.

In the related art, in the imaging device, a charge which is accumulated in a photodiode is read out as a signal level of a pixel signal depending on an accumulation time, and the signal level of the pixel signal is subjected to analogue-digital conversion. Various methods have been proposed in the related art for reading out the pixel signal (for example, refer to Japanese Unexamined Patent Application Publication No. 2006-033452).

For example, in the method taught in Japanese Unexamined Patent Application Publication No. 2006-033452, a pixel signal of the readout period of an n-th row and a reference signal to digitize the pixel signal are compared, a count process is performed in either a down mode or an up mode concurrently with the comparison process, and the count value of the point in time at which the comparison process completes is maintained. Next, using the result of the count process of the n-th row as the initial value, a pixel signal of the readout period of an n+1-th row and a reference signal to digitize the pixel signal are compared, a count process is performed in either a down mode or an up mode concurrently with the comparison process, and the count value of the point in time at which the comparison process completes is maintained. The count value after the count process of the n+1-th row is a subtraction result when the mode of the count process of the n+1-th row is opposite to the count mode of the n-th row, and is an addition result when the count modes are the same.

By adopting such a method of reading out a pixel signal, it is possible to maintain a compact circuit scale of the analogue-digital converter and a low number of transmission signal lines and also to efficiently perform a product-sum operation.

SUMMARY

However, when adopting the methods of the related art, there are concerns that a dark current will occur due to the gate operation of a Metal Oxide Semiconductor (MOS) transistor, that junction leakage will occur, or the like.

The charge accumulated in the floating diffusion due to these factors is added to the charge transferred from the photodiode or the like (the signal charge). Accordingly, there is a concern that this additional charge will be manifested in an imaged image as a point defect with a high output level, that is, as a white spot in a closed-shutter state and as a bright spot when light is incident. Furthermore, there is a concern that such point defects will lower the image quality of the imaged image.

It is desirable to suppress a dark current component of a pixel signal.

According to an embodiment of the present disclosure, there is provided an imaging device that includes a readout unit which reads out an amount of charge accumulated in a floating diffusion that accumulates a charge transmitted from a light receiving unit that photoelectrically converts incident light as a signal level; a readout control unit which controls the readout unit to perform, a plurality of times, a readout operation to read out the amount of charge of a P-phase and a D-phase accumulated in the floating diffusion; and a calculation unit which is controlled by the readout control unit and obtains differences between the signal levels which are obtained using the readout operation that is performed a plurality of times.

The readout control unit may cause the plurality of readout operations to be performed within one horizontal synchronization period.

The readout control unit may cause the readout operation to be performed two times within the one horizontal synchronization period.

The readout control unit may cause a first readout operation to be performed, and subsequently cause a second readout operation to be performed without initializing the light receiving unit.

The readout unit may include a reset transistor that controls initialization of the floating diffusion, and a readout transistor that controls movement of a charge from the light receiving unit to the floating diffusion.

In each of the readout operations, the readout control unit may turn on the reset transistor, initialize the floating diffusion, cause a readout of an amount of charge of a P-phase to be performed, and subsequently turn on the readout transistor, causes a charge of the light receiving unit to be moved to the floating diffusion and cause the readout of an amount of charge of a D-phase to be performed.

The readout control unit may cause the readout operation to be performed a plurality of times, subsequently turn on the reset transistor and the readout transistor and initialize the light receiving unit and the floating diffusion.

The readout unit may further include an amplification transistor that amplifies an amount of charge accumulated in the floating diffusion and converts the amplified charge into the signal level, and a select transistor that controls supply of the signal level to the calculation unit, and the readout control unit may turn on the select transistor during the plurality of readout operations.

The readout control unit may lower a frame rate in comparison to a case in which the readout operation is performed one time, and may cause the readout operation to be performed a plurality of times.

The calculation unit, in relation to a signal level obtained using a first readout operation, may use 0 as an initial value and count the signal level; in relation to a signal level obtained using a second readout operation, may use a count value of the signal level obtained using the first readout operation as an initial value, and count the signal level in an opposite orientation from the previous readout operation; and in relation to a signal level obtained using a third readout operation onward, may use a difference value of the signal levels obtained until the previous readout operation as an initial value, and count the signal level in an opposite orientation from the previous readout operation.

The calculation unit, in relation to a signal level obtained using a first readout operation, may use 0 as an initial value and count the signal level; in relation to a signal level obtained using a second readout operation, may invert a sign of a count value of a signal level obtained using the first readout operation, use the inverted count value as an initial value, and count the signal level in a same orientation as the previous readout operation; and in relation to a signal level obtained using a third readout operation onward, may invert a sign of a difference value of the signal levels obtained until the previous readout operation, use the inverted difference value as an initial value, and count the signal level in a same orientation as the previous readout operation.

The calculation unit may obtain a difference between a signal level obtained by the readout of the P-phase and a signal level obtained by the readout of the D-phase as a signal level obtained using the readout operation.

According to another embodiment of the present disclosure, there is provided an imaging apparatus which includes: an imaging device which includes a readout unit which reads out an amount of charge accumulated in a floating diffusion that accumulates a charge transmitted from a light receiving unit that photoelectrically converts incident light as a signal level, a readout control unit which controls the readout unit to perform, a plurality of times, a readout operation to read out the amount of charge of a P-phase and a D-phase accumulated in the floating diffusion, and a calculation unit which is controlled by the readout control unit and obtains differences between the signal levels which are obtained using the readout operation that is performed a plurality of times; and an image processing unit which performs image processing on an image of a subject that is photoelectrically converted in the imaging device.

According to still another embodiment of the present disclosure, there is provided a semiconductor device which includes a readout control unit which controls a readout unit provided on another semiconductor substrate, which reads out an amount of charge accumulated in a floating diffusion that accumulates a charge transmitted from a light receiving unit that photoelectrically converts incident light as a signal level, and causes a readout operation to read out the amount of charge of a P-phase and a D-phase accumulated in the floating diffusion to be performed a plurality of times; and a calculation unit which is controlled by the readout control unit and obtains differences between the signal levels which are obtained using the readout operation that is performed a plurality of times.

According to still another embodiment of the present disclosure, there is provided a readout method which reads out a signal level corresponding to an amount of charge accumulated in a floating diffusion that accumulates a charge transmitted from a light receiving unit that photoelectrically converts incident light from an imaging device, the method includes performing, a plurality of times, a readout operation to read out the signal level corresponding to the amount of charge of a P-phase and a D-phase accumulated in the floating diffusion that accumulates the charge transmitted from the light receiving unit that photoelectrically converts incident light; and obtaining differences between the signal levels which are obtained using the readout operation that is performed a plurality of times.

According to an embodiment or still another embodiment of the present disclosure, an amount of charge of a P-phase and a D-phase accumulated in the floating diffusion that accumulates the charge transmitted from the light receiving unit that photoelectrically converts incident light is read out a plurality of times as signal levels, and differences between the signal levels which are obtained using the readout operation that is performed a plurality of times are obtained.

According to another embodiment of the present disclosure, an amount of charge of a P-phase and a D-phase accumulated in the floating diffusion that accumulates the charge transmitted from the light receiving unit that photoelectrically converts incident light is read out a plurality of times as signal levels, differences between the signal levels which are obtained using the readout operation that is performed a plurality of times are obtained, and an image of a subject obtained as the differences is subjected to image processing.

According to the present disclosure, it is possible to suppress the dark current component of the pixel signal.

BRIEF DESCRIPTION OF THE DRAWINGS

FIG. 14 is a block diagram illustrating a principal configuration example of a computer.

DETAILED DESCRIPTION OF EMBODIMENTS

Hereafter, description will be given of embodiments for realizing the present disclosure (below, "embodiments"). Further, the description will be given in the following order.
1. First embodiment (imaging device)
2. Second embodiment (imaging apparatus)
3. Third embodiment (computer)

1. First Embodiment

CMOS Image Sensor

Figure 1:
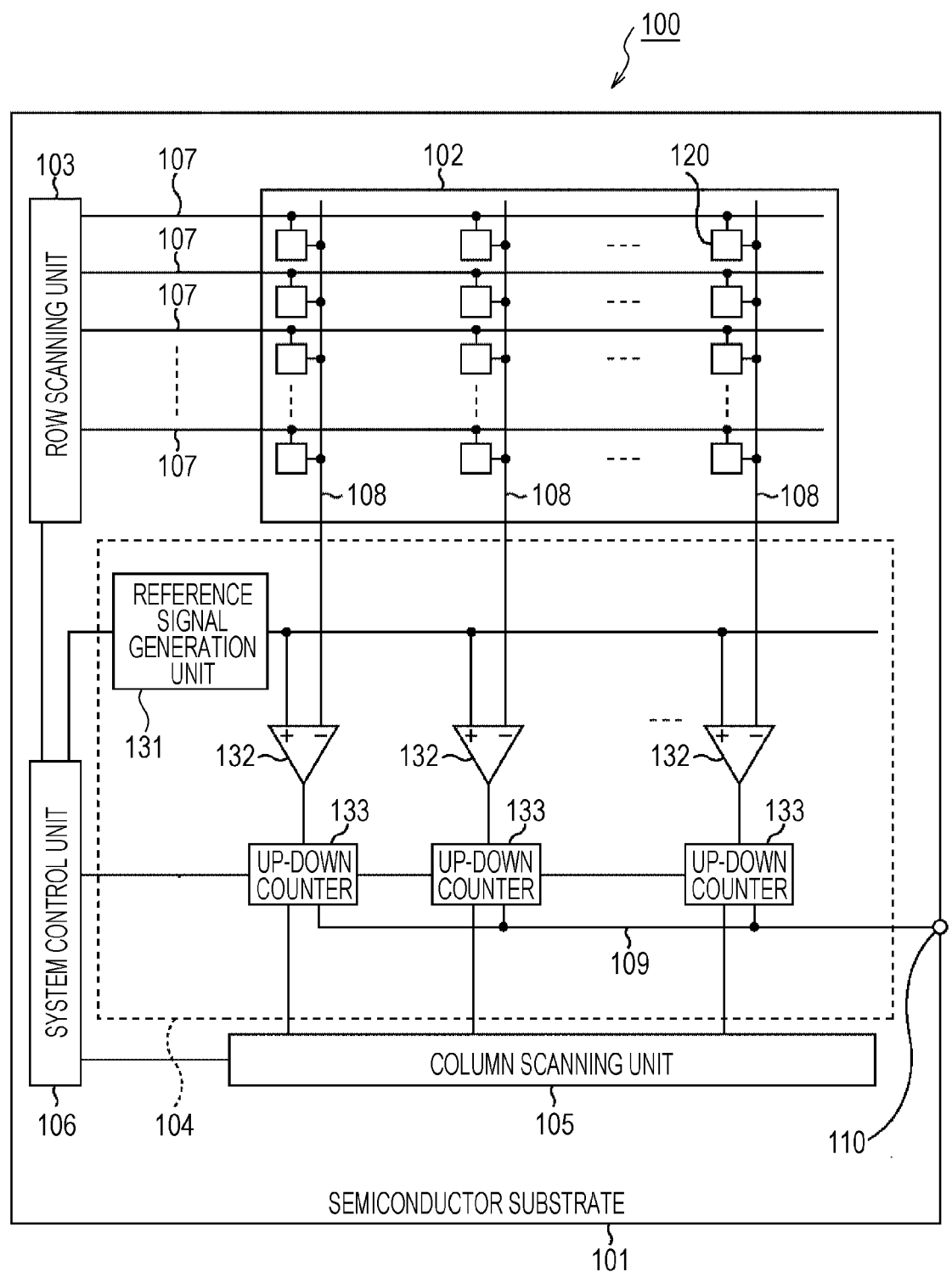
FIG. 1 is a diagram illustrating a principal configuration example of a CMOS image sensor.

FIG. 1 is a block diagram that shows a configuration example of a portion of an image sensor to which the present technology is applied. A Complementary Metal Oxide Semiconductor (CMOS) image sensor 100 shown in FIG. 1 is an imaging device which images a subject and obtains digital data of the imaged image.

In the CMOS image sensor 100, a plurality of analogue-digital conversion units to perform analogue-digital conversion using reference signals of different gradations from one another are provided in relation to one vertical signal line. Therefore, it is possible to partially realize an analogue-digital conversion operation with a high range of gradation without sacrificing frame rate.

Hereafter, a more detailed description will be given.

As shown in FIG. 1, the CMOS image sensor 100 is configured to include a pixel array unit 102 which is formed on a semiconductor substrate (below, also referred to as a "chip") 101, and peripheral circuit units which are integrated on the same chip 101 as the pixel array unit 102. In the present example, as examples of the peripheral circuit units, there are provided a row scanning unit 103, a column processing unit 104, a column scanning unit 105 and a system control unit 106.

Unit pixels (below, also simply referred to as "pixels") 120 are arranged two-dimensionally in a matrix pattern on the pixel array unit 102. Further, each of the unit pixels includes a photoelectric conversion device that generates a photocharge of an amount of charge corresponding to the amount of light incident and accumulates the photocharge therein. The squares within the pixel array unit 102 in FIG. 1 each represent one of the pixels 120. Furthermore, in FIG. 1, of the pixels 120 arranged in a matrix pattern, the reference numeral is only provided for the pixel 120 of the upper-right edge. However, in a case in which there is no particular desire to distinguish the pixels, any of the pixels arranged in a matrix pattern may be referred to as the "pixel 120".

The pixel array unit 102 is further provided with a pixel drive line 107 for each pixel row in relation to the pixels arranged in a matrix pattern, and a vertical signal line 108 for each pixel row. Furthermore, the pixel drive lines 107 are wired along the horizontal direction, that is, the row direction (the direction in which the pixels of a pixel row are arranged), and the vertical signal lines 108 are wired along the vertical direction, that is, the column direction (the direction in which the pixels of a pixel column are arranged). The pixel drive line 107 transmits a drive signal to perform the driving for the readout of a signal from a pixel. In FIG. 1, the pixel drive lines 107 are depicted as single wires, however, the configuration is not limited thereto. One end of each of the pixel drive lines 107 is connected to an output terminal which corresponds to each row of the row scanning unit 103.

The row scanning unit 103 is a pixel drive unit which includes a shift resistor, an address decoder and the like, and which drives each of the pixels 120 of the pixel array unit 102, all pixels simultaneously, by row unit, or the like. The specific configuration of the row scanning unit 103 is omitted from the drawings. However, generally, the row scanning unit 103 is configured to include two scanning systems of a readout scanning system and a sweeping scanning system.

In order to read out the signal from the unit pixels, the readout scanning system performs a sequential selection scan of the unit pixels of the pixel array unit 102 by row unit. The signals read out from the unit pixels are analogue signals. The sweeping scanning system performs a sweeping scan in relation to the readout row, which is subjected to a readout scan by the readout scanning system, ahead of the readout scan for the duration of the shutter speed.

According to the sweeping scan performed by the sweeping scanning system, a charge which may be unnecessary is swept out from the photoelectric conversion elements of the unit pixels of the readout row. Therefore, the photoelectric conversion elements are reset. Furthermore, a so-called electronic shutter operation is performed by the sweeping out (the resetting) of the charge which may be unnecessary by the sweeping scanning system. Here, the term "electronic shutter operation" refers to an operation in which the photocharge of the photoelectric conversion element is discarded and a new exposure is started (the accumulation of a photocharge is started).

The signal that is read out by the readout operation of the readout scanning system corresponds to the amount of light incident from the previous readout operation onward or from the electronic shutter operation onward. Furthermore, the period from the readout timing of the previous readout operation or the sweep timing of the electronic shutter operation until the readout timing of the present readout operation is the accumulation period (the exposure period) of the photocharge in the unit pixel.

The signal output from each of the pixels 120 of the pixel row which is subjected to a selection scan by the row scanning unit 103 is supplied to the column processing unit 104 through each of the vertical signal lines 108. For each pixel column of the pixel array unit 102, the column processing unit 104 performs predetermined signal processing on the signal output from each of the pixels 120 of the row selected by the row scanning unit 103 through the vertical signal line 108, and temporarily maintains the pixel signal after the signal processing.

Specifically, the column processing unit 104 receives a signal of the unit pixel 120 and performs signal processing such as noise removal by Correlated Double Sampling (CDS), signal amplification and analogue-digital conversion on the signal.

For example, the noise removal by CDS is performed by taking the difference between a reset level which is read out when the unit pixel (in actuality, the floating diffusion unit described below) is reset and a signal level which is read out corresponding to the signal charge photoelectrically converted by the photoelectric conversion element. Fixed pattern noise inherent to the pixels, such as reset noise and threshold deviation of an amplification transistor, is removed by the noise removal process. Furthermore, the signal processing exemplified herein is merely an example, and the signal processing is not limited thereto.

As shown in FIG. 1, the column processing unit 104 includes a reference signal generation unit 131, comparators 132 and up-down counters 133. Only one reference signal generation unit 131 is provided, however, the comparators 132 and the up-down counters 133 are provided for each column of the pixel array.

The reference signal generation unit 131 generates a reference signal of a ramp waveform that is used in the comparison with the pixel signal and supplies the ramp waveform to each of the comparators 132.

The comparator 132 compares the reference signal generated by the reference signal generation unit 131 with the pixel signal read out from the pixel that is selected by the row scanning unit 103 of the pixel column which the comparator 132 corresponds to. Then, as the comparison result, the comparator 132 supplies a binary signal which indicates which signal is greater to the up-down counter 133 that corresponds to the same pixel column as the comparator 132 itself.

The up-down counter 133 counts the period from when the comparator 132 starts the comparison (in other words, from when the outputting of the comparison result starts) until when the value of the comparison result changes. Since the reference signal is a lamp waveform, the comparator 132 outputs a signal value that indicates that the pixel signal is greater than the reference signal until the signal level reaches the signal level of the pixel signal. Furthermore, when the signal level of the reference signal reaches the signal level of the pixel signal, the comparator 132 inverts the signal value output therefrom.

In other words, the time from when the signal output from the comparator 132 starts until when the signal level of the output signal is inverted represents the signal level of the pixel signal. Therefore, during this time the up-down counter 133 measures the length of the time by counting a unit time at a predetermined pace. In other words, the count value represents the length of the time, that is, the signal level of the pixel signal.

The up-down counter 133 can count up to increment the count value and can count down to decrement the count value. For example, the up-down counter 133 can obtain the values of the differences between the count values by continually performing the counting in alternately opposite directions. For example, after counting up, the count value obtained by counting down, with the count value obtained by counting up as the initial value, is the value of the difference between the count value obtained by counting up and the count value obtained by counting down.

Furthermore, for example, the up-down counter 133 may also obtain the value of the difference between the two count values by inverting the sign (positive to negative, or vice-versa) of the count value after counting up, then counting up again using the inverted value as the initial value. Naturally, it is also possible to obtain the value of the difference in the same manner when counting down.

The operation of the column processing unit 104 is controlled by the column scanning unit 105 or the system control unit 106.

The column scanning unit 105 is configured to include a shift resistor, an address decoder and the like, and sequentially selects the unit circuits of the column processing unit 104 which correspond to the pixel columns. According to the selection scanning performed by the column scanning unit 105, the pixel signals that are subjected to signal processing by the column processing unit 104 are sequentially output to a horizontal bus 109, supplied to an output terminal (Vout) 110 via the horizontal bus 109, and transmitted from the output terminal 110 to the outside of the semiconductor substrate 101 (the CMOS image sensor 100).

The system control unit 106 receives a clock signal provided from outside of the semiconductor substrate 101, data which commands the operation mode and the like. In addition, the system control unit 106 outputs data such as internal information of the CMOS image sensor 100. The system control unit 106 further includes a timing generator that generates various types of timing signal and directly or indirectly performs the drive control of the peripheral circuit units such as the row scanning unit 103, the column processing unit 104 and the column scanning unit 105 on the basis of the various types of timing signal generated by the timing generator.

Furthermore, in FIG. 1, the configurations described above are all illustrated so as to be formed on one semiconductor substrate 101. However, the configurations may also be formed on a plurality of semiconductor substrates. For example, a configuration may also adopted in which the pixel array unit 102, the row scanning unit 103, the column processing unit 104, the column scanning unit 105 and the system control unit 106 are alternately formed on different substrates and the CMOS image sensor 100 is formed as a laminated imaging device where the two substrates are laminated together.

Pixel Configuration

Figure 2:
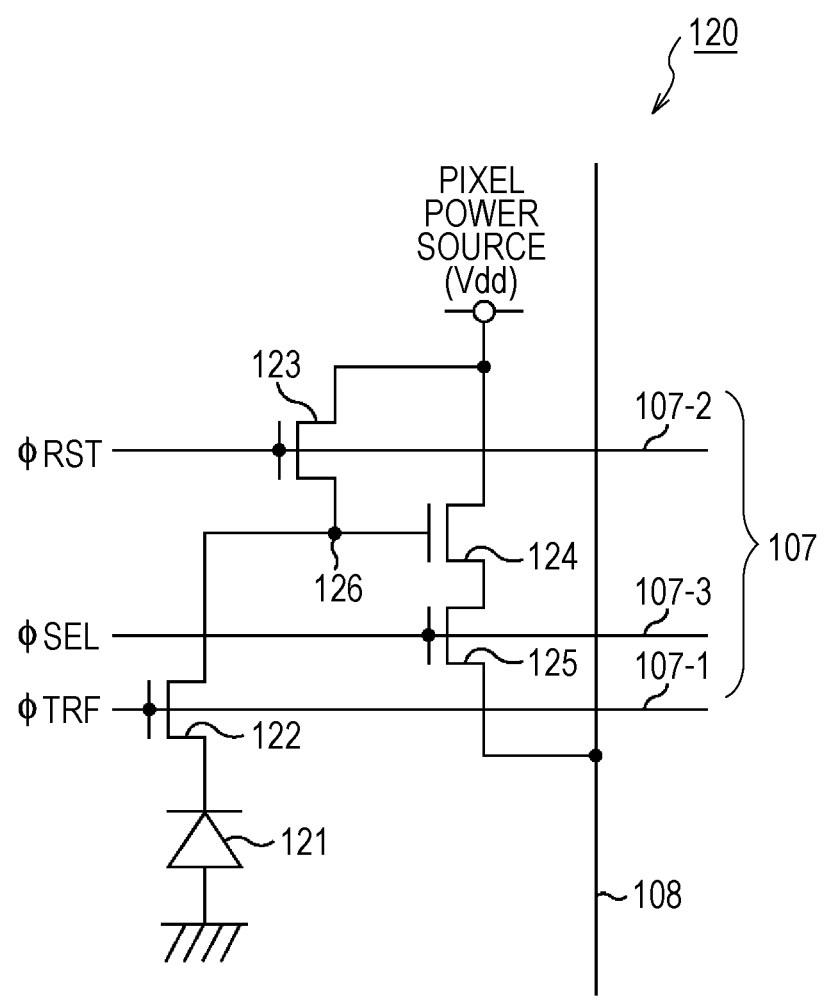
FIG. 2 is a diagram illustrating a principal configuration example of a unit pixel.

FIG. 2 is a circuit diagram showing an example of the circuit configuration of the pixel 120. As shown in FIG. 2, in addition to a photodiode 121, for example, which serves as a photoelectric conversion unit (a light receiving unit), the pixel 120 includes, for example, four transistors of a readout transistor 122, a reset transistor 123, an amplification transistor 124 and a select transistor 125.

Here, N channel Metal Oxide Semiconductor (MOS) transistors, for example, are used as the four transistors (the readout transistor 122 to the select transistor 125). However, the combination of conductivity types of the readout transistor 122, the reset transistor 123, the amplification transistor 124 and the select transistor 125 exemplified here are merely an example and the configuration is not limited to this combination.

In relation to the pixel 120, as the pixel drive line 107, for example, three lines of drive wiring of a transfer line 107-1, a reset line 107-2 and a select line 107-3 are provided in common for each of the pixels in the same pixel row. One end of each of the transfer line 107-1, the reset line 107-2 and the select line 107-3 is connected to the output terminals, which correspond to each of the pixel rows, of the row scanning unit 103 by pixel row unit. Furthermore, the transfer line 107-1, the reset line 107-2 and the select line 107-3 respectively transmit a transfer pulse φTRF, a reset pulse φRST and a selection pulse φSEL which are drive signals to drive the pixel 120.

In the photodiode 121, the anode electrode is connected to the negative side power supply (for example, the ground). In addition, the photodiode 121 photoelectrically converts the received light into a photocharge (here, photoelectrons) of an amount of charge corresponding to the amount of light and accumulates the photocharge. The cathode electrode of the photodiode 121 is electrically connected to the gate electrode of the amplification transistor 124 via the readout transistor 122. A node 126 which is electrically connected to the gate electrode of the amplification transistor 124 is referred to as the FD (floating diffusion) unit.

The readout transistor 122 is connected between the cathode electrode of the photodiode 121 and an FD unit 126. A transfer pulse φTRF, in which a high level (for example, the Vdd level) is active (hereafter, referred to as "high active"), is supplied to the gate electrode of the readout transistor 122 via the transfer line 107-1. Accordingly, the readout transistor 122 enters an on state and transfers the photocharge that is photoelectrically converted by the photodiode 121 to the FD unit 126.

The drain electrode and the source electrode of the reset transistor 123 are respectively connected to the pixel power supply Vdd and the FD unit 126. The high active reset pulse φRST is supplied to the gate electrode of the reset transistor 123 via the reset line 107-2. Accordingly, the reset transistor 123 enters an on state and the FD unit 126 is reset by discarding the charge of the FD unit 126 into the pixel power supply Vdd.

The gate electrode and the drain electrode of the amplification transistor 124 are respectively connected to the FD unit 126 and the pixel power supply Vdd. Furthermore, the amplification transistor 124 outputs the potential of the FD unit 126 as the reset signal (the reset level) after the FD unit 126 is reset by the reset transistor 123. The amplification transistor 124 further outputs the potential of the FD unit 126 as the photo accumulated signal (the signal level) after the signal charge is transferred by the readout transistor 122.

For example, the drain electrode and the source electrode of the select transistor 125 are respectively connected to the source electrode of the amplification transistor 124 and the vertical signal line 108. The high active selection pulse φSEL is supplied to the gate electrode of the select transistor 125 via the select line 107-3. Accordingly, the select transistor 125 enters an on state and, where the pixel 120 is in a selected state, relays the signal output from the amplification transistor 124 to the vertical signal line 108.

Furthermore, a circuit configuration may also be adopted in which the select transistor 125 is connected between the pixel power supply Vdd and the drain of the amplification transistor 124.

In addition, the pixel 120 is not limited to a pixel configuration formed from four transistors as described in the above configuration. For example, the pixel 120 may also be of a pixel configuration formed from three transistors, in which one transistor is used for both the amplification transistor 124 and the select transistor 125, and the configuration of the pixel circuit is not an issue.

Column ADC

The column processing unit 104 of FIG. 1 receives the pixel signal (the analogue signal) transmitted via the vertical signal line 108 and outputs the pixel signal (the digital signal). In other words, the column processing unit 104 performs analogue-digital conversion on the pixel signals transmitted from each of the pixel columns. That is, the column processing unit 104 includes an analogue-digital converter for each of the pixel columns. The analogue-digital converter is referred to as the column ADC (Analogue Digital Converter).

Figure 3:
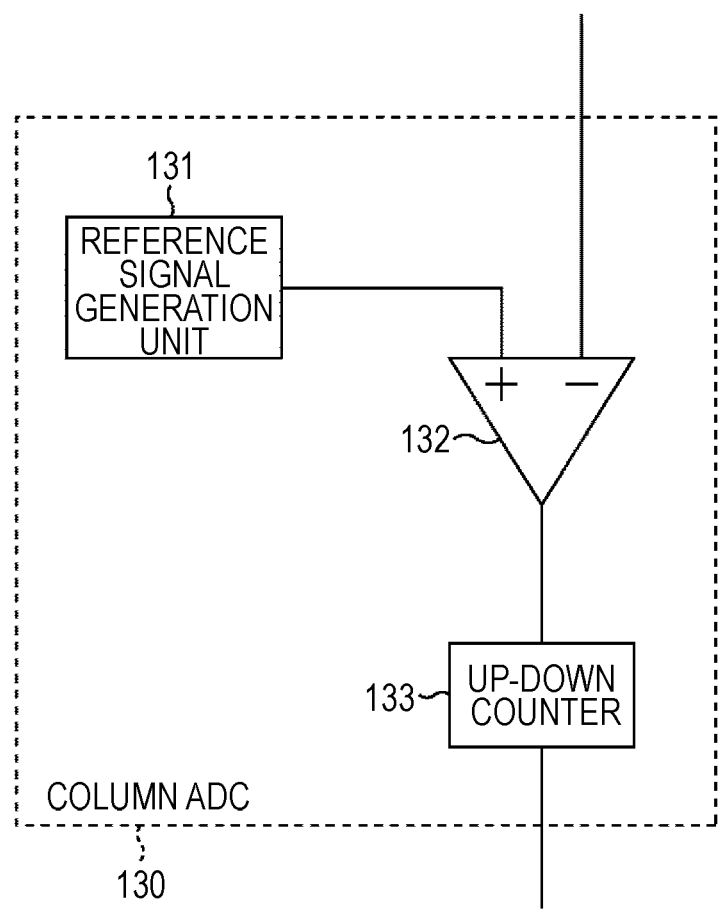
FIG. 3 is a diagram illustrating a principal configuration example of a column ADC.

In other words, as shown in FIG. 3, a column ADC 130 that corresponds to a certain pixel column includes the reference signal generation unit 131 which is common to all of the pixel columns, and the comparator 132 and the up-down counter 133 which correspond to the pixel column.

State of Pixel Signal Readout of Related Art

In the method of reading out the pixel signal of the related art, first, the charge of the floating diffusion is reset, therefore setting the floating diffusion to a potential state which serves as a basis. Voltage conversion is performed on the potential using a source follower circuit configured from an amplification transistor and a load Metal Oxide Semiconductor (MOS). This voltage state is referred to as the P-phase.

Next, the digital value of the P-phase is extracted using the column ADC 130. At this time, the count method is counted down and maintained in the counter. Next, the readout gate is opened in order to transfer the signal charge accumulated in the photodiode to the floating diffusion. The floating diffusion charge, to which the charge from the photodiode is transferred, is subjected to voltage conversion using the source follower circuit in the same manner as in the case of the P-phase. This voltage state is referred to as the D-phase.

The D-phase is also converted to a digital value by the column ADC 130. It is possible to extract the voltage difference between the P-phase and the D-phase as a digital value by counting up the D-phase value from a state in which the P-phase has been counted down and stored. The digital value is the amount of charge accumulated in the photodiode.

According to this readout operation, the reset noise which is generated when the floating diffusion is reset is removed using Correlated Double Sampling (CDS).

However, even if the charge of the floating diffusion is reset, for example, a sharp electric field is generated between the floating diffusion, which is an N-type diffusion layer, and the surrounding P-type diffusion layers. Therefore, there is a case in which this causes junction leakage to occur due to the potential structure of the floating diffusion. There is a case in which the leakage continually supplies a charge to the floating diffusion, thereby adding a charge (the occurrence of a dark current) to the signal charge. There is a concern that this added charge will be manifested in an imaged image as a point defect with a high output level, that is, as a white spot in a closed-shutter state and as a bright spot when light is incident.

Figure 4:
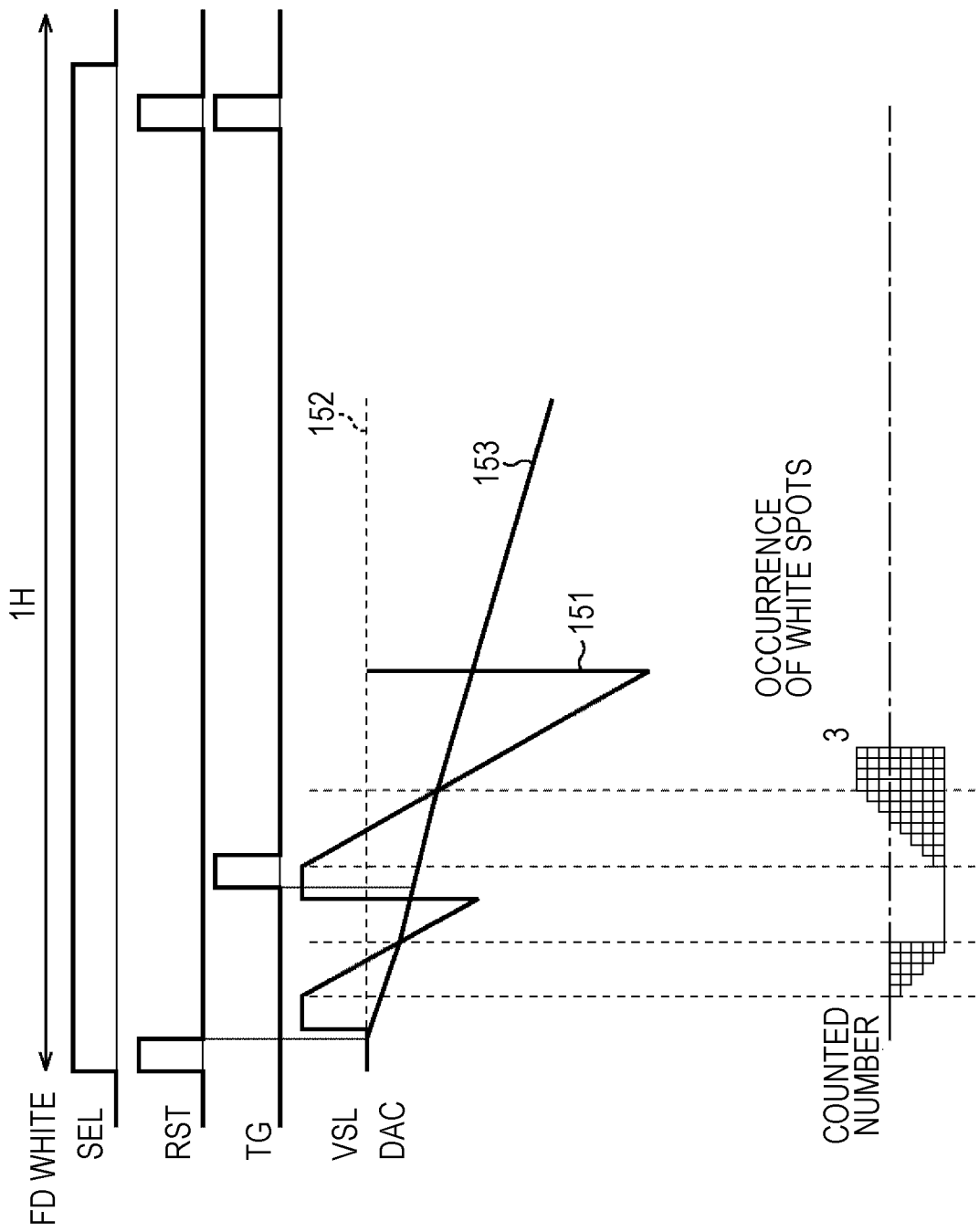
FIG. 4 is a diagram illustrating an example of a state of a signal readout in the related art.

An example of the pixel signal readout when the pixel is dark (when the pixel signal level is 0) is shown in FIG. 4. As shown in FIG. 4, since the reading out of the P-phase and the D-phase is performed within one horizontal synchronization period (1H), the waveform of the reference signal takes the form of a curved line 151 (DAC).

Conversely, since the pixel is dark, the pixel signal (VSL) read out from the vertical signal line 108 normally maintains a fixed value (the signal level 0) as in a dotted line 152. However, in actuality, a charge is continually supplied to the floating diffusion by the generation of junction leakage. Therefore, there is a concern that the waveform of the pixel signal (VSL) will change as in a curved line 153.

In addition, the readout transistor (the readout gate) is turned on when transferring the charge accumulated in the photodiode to the floating diffusion. Accordingly, the electric field becomes sharp at the potential structure under the gate, for example, and since the charge accelerates, the charge collides with the Si atoms and an electron-hole pair is generated. There is a concern that the generated charge will be injected to the floating diffusion.

There is a concern that this injected charge, due to being added to the signal charge, will be manifested in an imaged image as a point defect with a high output level, that is, as a white spot in a closed-shutter state and as a bright spot when light is incident.

Figure 5:
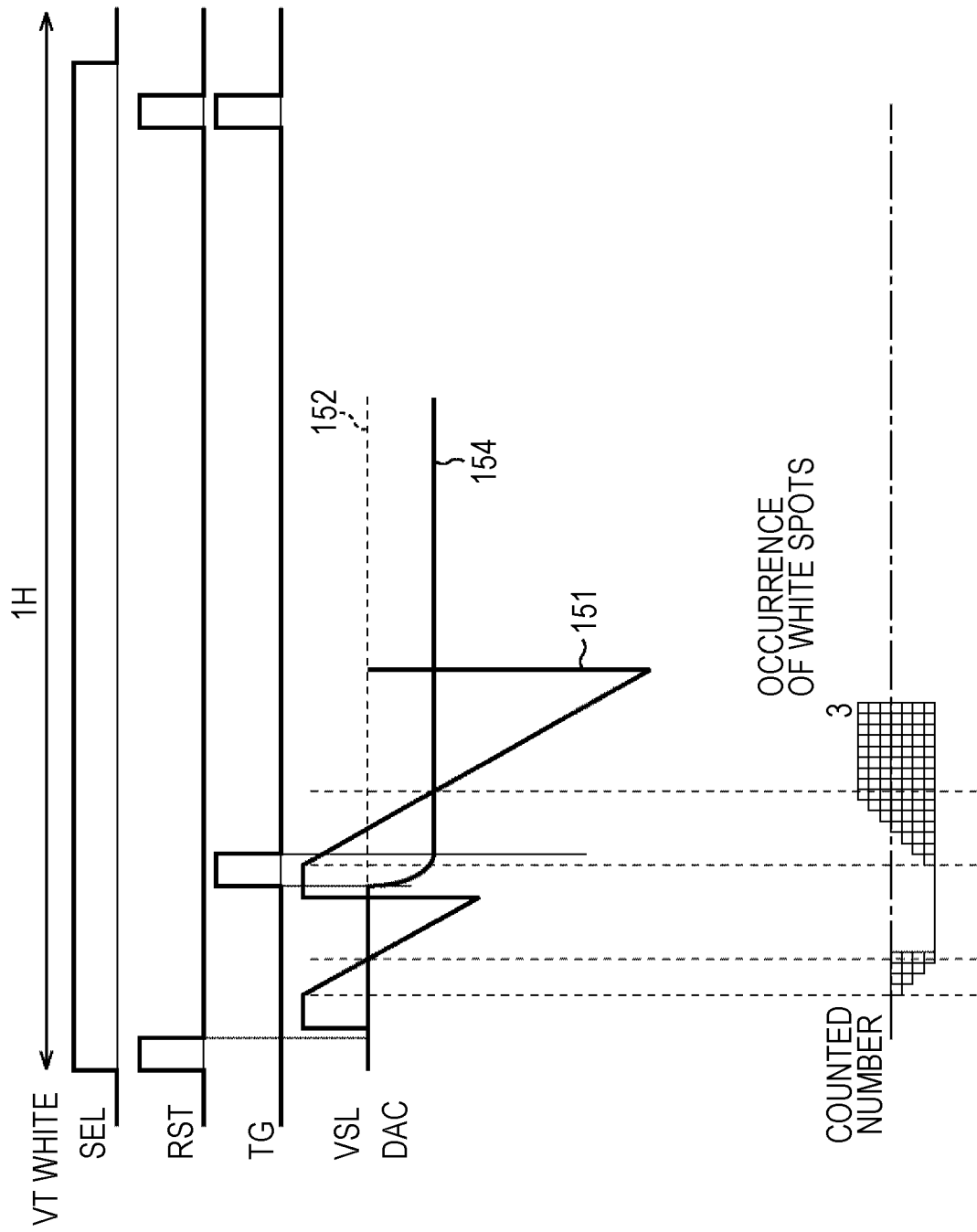
FIG. 5 is a diagram illustrating an example of a state of a signal readout in the related art.

An example of the pixel signal readout when the pixel is dark (when the pixel signal level is 0) is shown in FIG. 5. As shown in FIG. 5, since the reading out of the P-phase and the D-phase is performed within one horizontal synchronization period (1H), the waveform of the reference signal takes the form of the curved line 151 (DAC) (same as FIG. 4).

Conversely, since the pixel is dark, the pixel signal (VSL) read out from the vertical signal line 108 normally maintains a fixed value (the signal level 0) as in the dotted line 152 (same as FIG. 4). However, in actuality, as described above, a charge is injected to the floating diffusion by the readout operation. Therefore, there is a concern that the waveform of the pixel signal (VSL) will change as in the curved line 154.

As described above, when the signal level of the pixel signal (VSL) is different during the readout of the P-phase and during the readout of the D-phase, even when the pixel is dark, the difference between both of the pixel signals is not 0. The difference value is contained in the pixel signal as the dark current component.

Accordingly, there is a concern that this dark current will be manifested in an imaged image as a point defect with a high output level, that is, as a white spot in a closed-shutter state and as a bright spot when light is incident. That is, there is a concern that the image quality of the imaged image will be degraded.

In particular, when the pixel is dark, since the signal charge is low, the relative proportion of the dark current increases. In addition, when the pixel is dark, the pixel values of the surrounding pixels are also frequently small. Therefore, the degradation of the image quality is likely to become conspicuous, such as in the form of white spot defects.

The occurrence of a dark current due to the gate operation of an MOS transistor and the occurrence of junction leakage are physical phenomena which are difficult to avoid in semiconductors. Therefore, rather than suppressing the occurrence of such dark currents, the charge caused by the readout operation and the excess charge that is injected to the floating diffusion by the junction leakage are detected using a series of readout operations, subtracted and rejected from the imaged image.

In other words, the readout unit which reads out, as the signal level, the charge value accumulated in the floating diffusion which accumulates the charge transmitted from the light receiving unit that photoelectrically converts the incident light is controlled to perform, a plurality of times, a readout operation to read out the amounts of charge of the P-phase and the D-phase accumulated in the floating diffusion. Then, the differences between the signal levels which are obtained using the readout operation that is performed a plurality of times are obtained.

For example, an operation in which the readout of the photodiode and the analogue-digital conversion are performed continually is added to the state in which the signal charge is read out, analogue-digital converted and maintained as a digital value in the related art. In this case, the operation of the counter during the analogue-digital conversion of the added readout operation is counted up in the P-phase and counted down in the D-phase.

There are noise components such as the charge caused by the readout gate that is injected to the floating diffusion and the charge that is injected due to the potential structure of the floating diffusion after resetting. Such noise components are extracted as negative digital values due to the added readout operation.

Furthermore, here, by performing an additional drive in the same 1H period as the signal charge readout of the photodiode, it is possible to suppress the photoelectric conversion at the photodiode and the accumulation time of the charge to a minute time. Therefore, it is possible to extract only the dark current component caused by the readout operation without the readout operation receiving the influence of the dark current component and the photoelectrical conversion component of the photodiode.

In addition, in a state in which a digital value of the related art read out from a signal charge in which the signal charge and the dark current component caused by the driving are mixed together is maintained, the added readout drive is performed. Accordingly, the dark current component caused by the driving is extracted as a negative digital value, and at the same time, the digital values of "the signal charge and the dark current component caused by the driving" and "the dark current component caused by the driving" are added together. As a result, the dark current component is removed and it is possible to output only the signal component corresponding to the accumulation time as a digital value.

As described above, the dark signal caused by the operation of the readout gate and the dark signal caused by the floating diffusion are removed. Accordingly, it is possible to reduce the white spot defects due to the dark signal caused by the driving when illumination is low and it is possible to improve the image quality. In addition, when the floating diffusion is shared by a plurality of pixels, it is possible to reduce the occurrence of successive point defects that occur in a shared profile and it becomes easier to improve the image quality and to correct point defects in the later stages. Furthermore, in a black and white product in which pixels are shared, point defect correction is performed using the neighboring pixels. Therefore, the occurrence of a single point defect is likely to be judged as unrecoverable, however, it is possible to recover such a defect by using the point defect correction to which the present disclosure is applied. In addition, the manufacturing productivity can be improved due to the relaxation in the selection criterion for point defects.

Flow of Pixel Signal Readout Process

Next, description will be given of a specific example of the flow of process. First, description is given of an example of the flow of a pixel signal readout process with reference to the flowchart of FIG. 6. Furthermore, the pixel signal readout process is the process in relation to one pixel. However, in actuality, the same process is performed in a predetermined order in relation to all of the pixels of the pixel array unit 102.

When the pixel signal readout process starts, in step S101, the CMOS image sensor 100 performs the first pixel signal readout. The pixel signal readout is a process in which the charge accumulated in the floating diffusion is read out as a voltage (a signal level) and subjected to analogue-digital conversion. Furthermore, the pixel signal readout process contains both a P-phase readout and a D-phase readout. The process will be described in detail below.

In step S102, the CMOS image sensor 100 inverts the count direction of the up-down counter 133 in relation to the process of step S101 and performs the second pixel signal readout. The second pixel signal readout process is basically the same process as the first pixel signal readout process of step S101. However, the directions of the counting are inverted in relation to one another. In other words, the orientations of the counting during the P-phase readout and of the counting during the D-phase readout are respectively the opposite orientations to those in the process of step S101. In addition, the process is started after the process of step S101 without the photodiode 121 being reset.

As described above, after performing the readout two times, in step S103, the system control unit 106 controls the row scanning unit 103 to turn on both the reset transistor 123 and the readout transistor 122 of the current pixel, which is the processing target, therefore initializing the photodiode 121 and the floating diffusion (the FD unit) 126.

When the process of step S103 completes, the pixel signal readout process completes.

Flow of First Pixel Signal Readout Process

Next, with reference to the flowchart of FIG. 7, description will be given of an example of the flow of the first pixel signal readout process that is executed in step S101 of FIG. 6.

When the first pixel signal readout process starts, in step S121, the row scanning unit 103 turns on the reset transistor 123 and initializes the floating diffusion 126.

In step S122, the row scanning unit 103 reads out the charge that is accumulated in the floating diffusion 126 as a voltage (the signal level of the pixel signal) in a state before the signal charge is transmitted from the photodiode 121.

In step S123, the up-down counter 133 counts down the signal level of the pixel signal that is read out in step S122 from a reset state (with 0 as the initial value). In step S124, the up-down counter 133 maintains the count value.

Each process of steps S121 to S124 described above is a process relating to the P-phase.

In step S125, the row scanning unit 103 turns the readout transistor 122 on and transmits (opens the readout gate) the charge that is accumulated in the photodiode 121 to the floating diffusion 126.

In step S126, the row scanning unit 103 reads out the charge that is accumulated in the floating diffusion 126 as a voltage (the signal level of the pixel signal) in a state in which the signal charge is transmitted from the photodiode 121.

In step S127, the up-down counter 133 counts up the signal level of the pixel signal which is read out in step S126, with the value (the count value of the P-phase) maintained in step S124 as the initial value. Accordingly, the difference between the count values of the P-phase and the D-phase is obtained as the count value.

In step S128, the up-down counter 133 maintains the count value (the first difference value).

Each process of steps S125 to S128 described above is a process relating to the D-phase.

Figure 6:
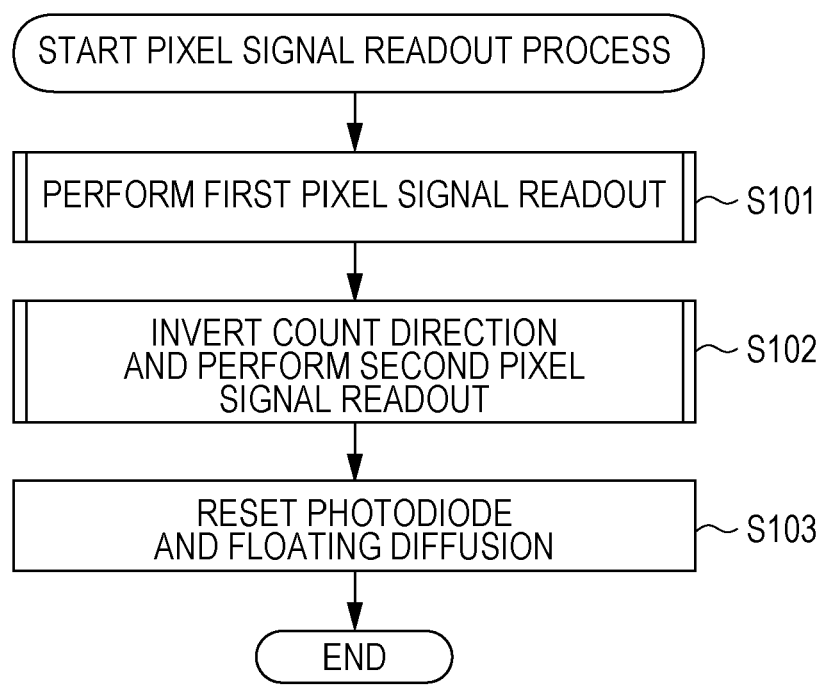
FIG. 6 is a flowchart illustrating an example of the flow of a pixel signal readout process.
Figure 7:
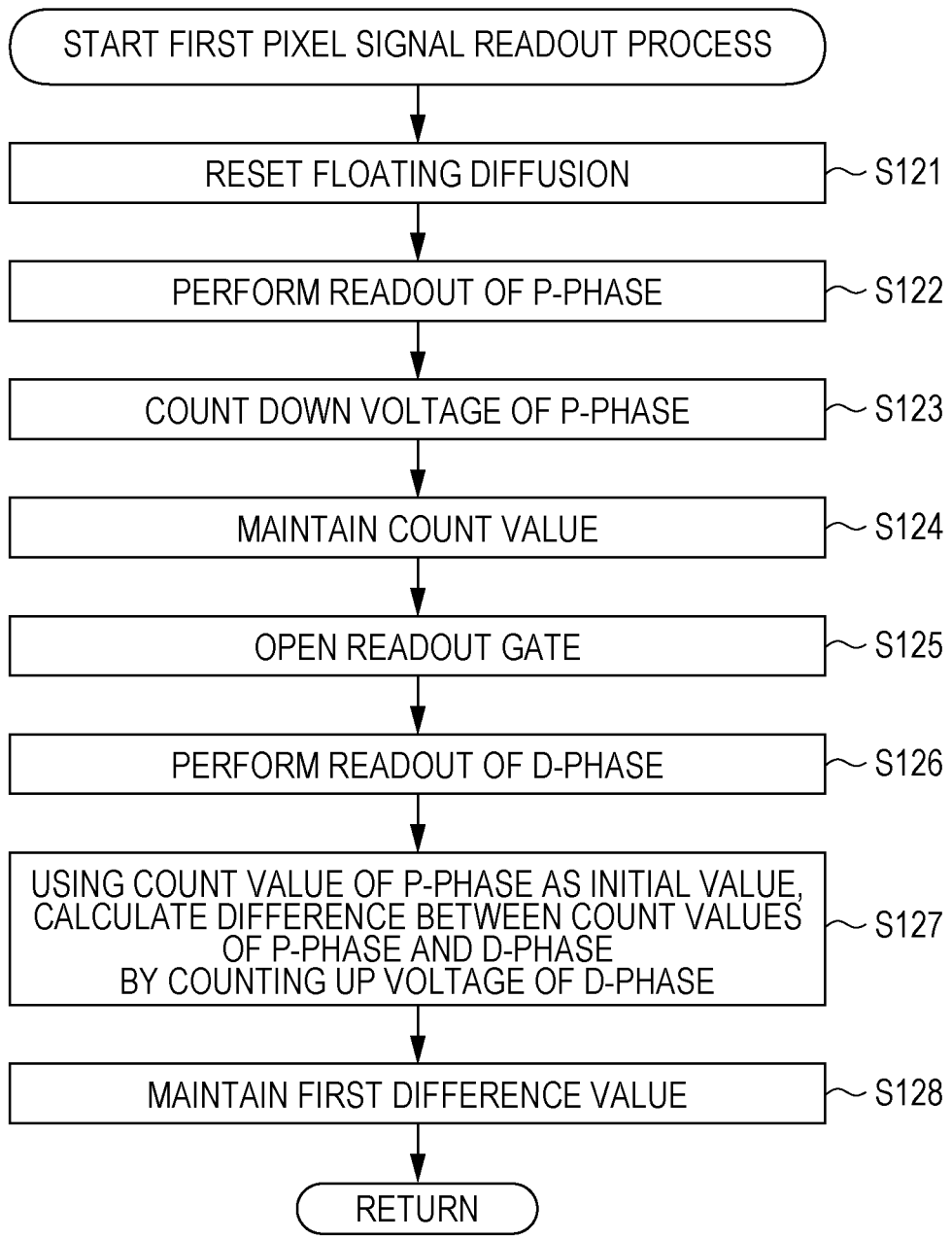
FIG. 7 is a flowchart illustrating an example of the flow of a first pixel signal readout process.

When the process of step S128 completes, the first pixel signal readout process completes and the process returns to FIG. 6.

Flow of Second Pixel Signal Readout Process

Figure 8:
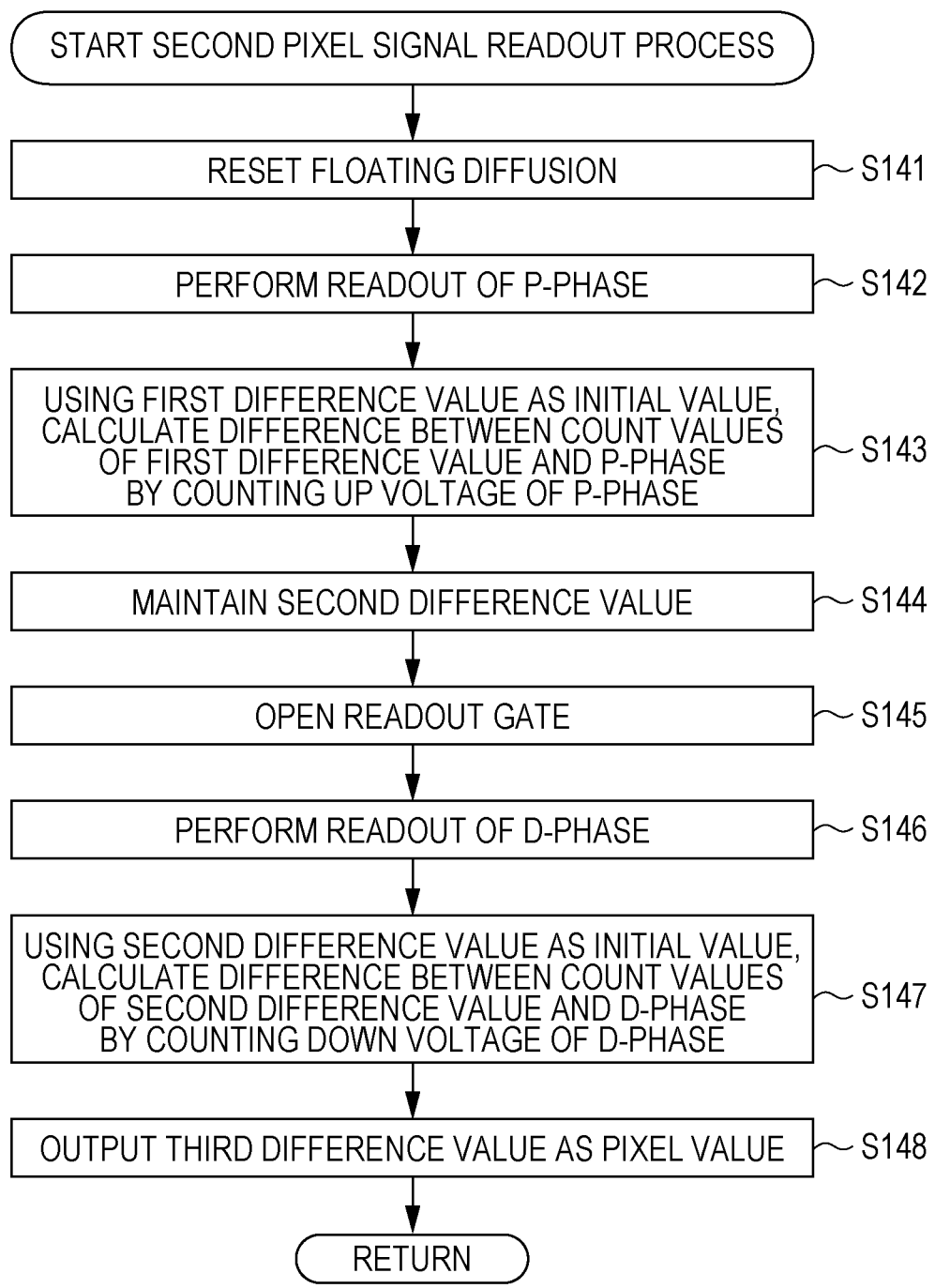
FIG. 8 is a flowchart illustrating an example of the flow of a second pixel signal readout process.

Next, with reference to the flowchart of FIG. 8, description will be given of an example of the flow of the second pixel signal readout process that is executed in step S102 of FIG. 6.

When the second pixel signal readout process starts, in step S141, the row scanning unit 103 turns on the reset transistor 123 and initializes the floating diffusion 126.

In step S142, the row scanning unit 103 reads out the charge that is accumulated in the floating diffusion 126 as a voltage (the signal level of the pixel signal) in a state before the signal charge is transmitted from the photodiode 121.

In step S143, the up-down counter 133 counts up the signal level of the pixel signal that is read out in step S122. Furthermore, when starting this process, the up-down counter 133 is not initialized, and the count value is still that of the first difference value (step S128 of FIG. 7). In other words, the up-down counter 133 counts up with the first difference value as the initial value. In addition, whereas the up-down counter 133 counted down in the first pixel signal readout process (step S123 of FIG. 7), here, the up-down counter 133 counts up. In other words, the up-down counter 133 counts in the opposite orientation to that in the case of the first pixel signal readout process.

In step S144, the up-down counter 133 maintains the count value (the second difference value). Each process of steps S141 to S144 described above is a process relating to the P-phase.

In step S145, the row scanning unit 103 turns the readout transistor 122 on and transmits (opens the readout gate) the charge that is accumulated in the photodiode 121 to the floating diffusion 126.

Furthermore, the photodiode 121 is not initialized after the first pixel signal readout process is performed. In other words, according to this process, after the process of step S125 of FIG. 7, the signal charge that is accumulated in the photodiode 121 is transmitted to the floating diffusion. However, the process of step S145 is performed within one horizontal synchronization period (1H) after the process of step S125 of FIG. 7 is performed. Therefore, the amount of charge accumulated in the photodiode 121 is extremely small, and particularly when the pixel is dark, the amount of charge is of a degree that may be ignored.

In step S146, the row scanning unit 103 reads out the charge that is accumulated in the floating diffusion 126 as a voltage (the signal level of the pixel signal) in a state in which the signal charge is transmitted from the photodiode 121.

In step S147, the up-down counter 133 counts down the signal level of the pixel signal which is read out in step S146, with the value (the second difference value) maintained in step S144 as the initial value. Accordingly, the difference between the count values of the P-phase and the D-phase are obtained as the count value. In other words, here too, the up-down counter 133 counts in the opposite orientation to that in the case of the first pixel signal readout process (step S127 of FIG. 7).

In step S148, the up-down counter 133 maintains the count value (the third difference value).

Each process of steps S145 to S148 described above is a process relating to the D-phase.

When the process of step S148 completes, the second pixel signal readout process completes and the process returns to FIG. 6.

State of Pixel Signal Readout

Figure 9:
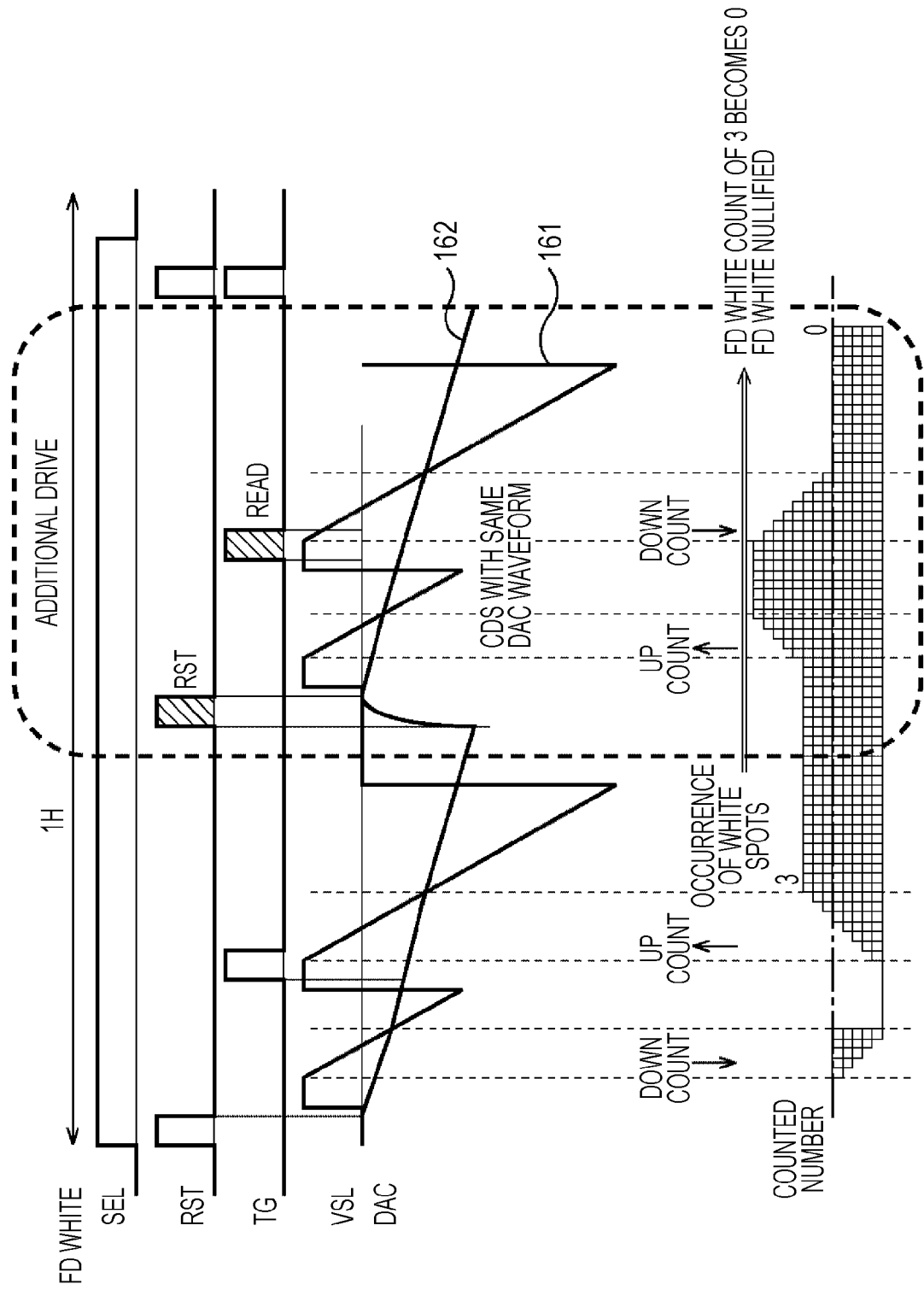
FIG. 9 is a diagram illustrating an example of a state of a signal readout.

By reading out the pixel signal two times as described above, as shown in FIG. 9, the reference signal repeats the same waveform as in a curved line 161. Whereas, the injection of the charge to the floating diffusion due to the junction leakage is repeated in the same manner. Therefore, the waveform of the pixel signal (VSL) repeats the same waveform, as in a curved line 162.

In other words, by inverting the first and the second counts of the pixel signal in relation to one another, it is possible to cancel out the injection of charge to the floating diffusion caused by the junction leakage. In actuality, as well as the dark current component, the signal charge component that is accumulated in the photodiode 121 is also detected. However, as described above, after the first readout, the second readout is performed without initializing the photodiode 121. Therefore, the signal charge component is not cancelled out. In other words, the dark current component is reduced and mainly the signal charge component is extracted.

Figure 10:
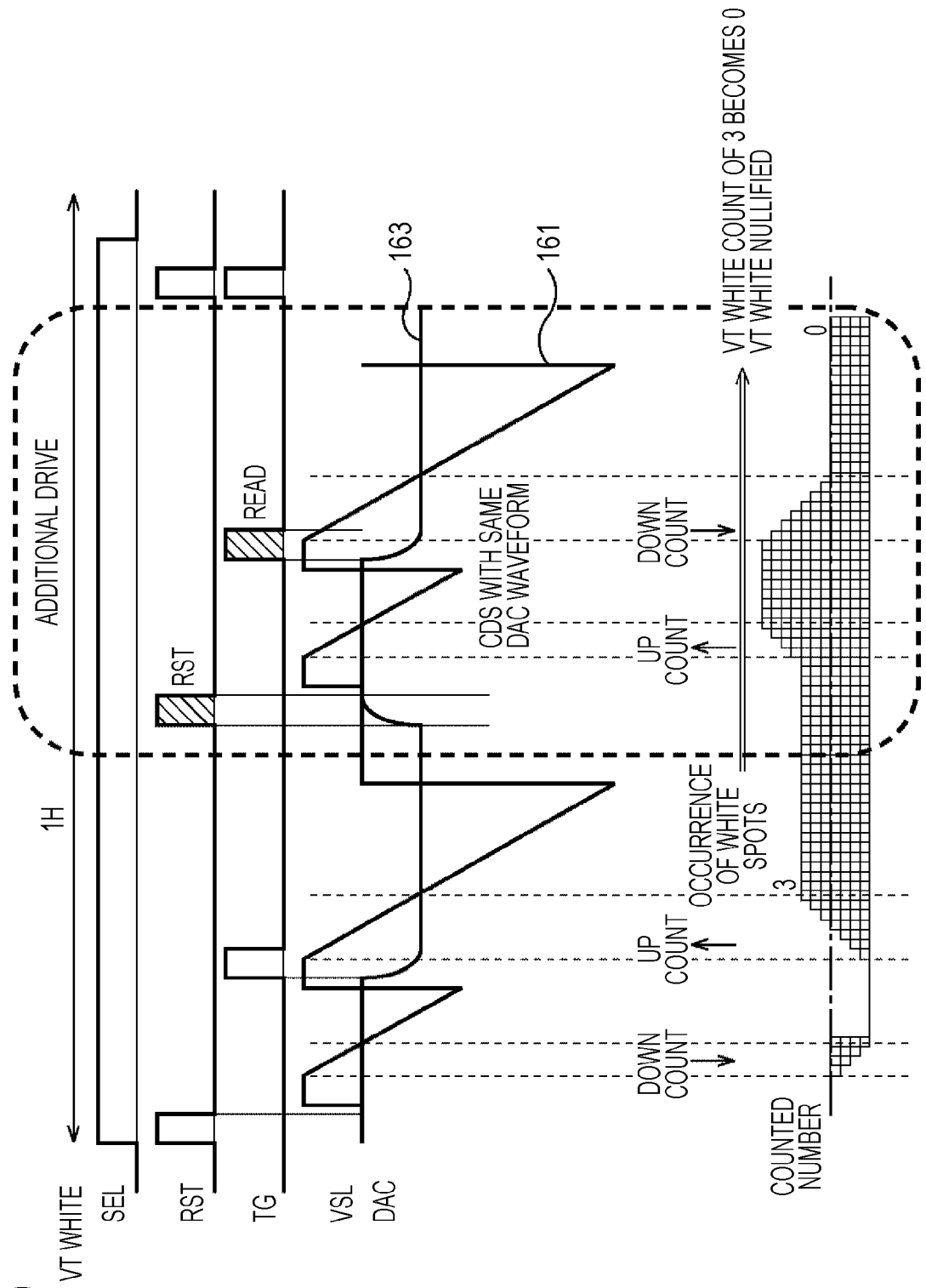
FIG. 10 is a diagram illustrating an example of a state of a signal readout.

The same applies to the injection of charge to the floating diffusion caused by the readout operation. As shown in FIG. 10, by repeating the injection of charge to the floating diffusion caused by the readout operation, the waveform of the pixel signal (VSL) repeats the same waveform as in a curved line 163.

In other words, by inverting the first and the second counts of the pixel signal in relation to one another, it is possible to cancel out the injection of charge to the floating diffusion caused by the readout operation. In actuality, as well as the dark current component, the signal charge component that is accumulated in the photodiode 121 is also detected. However, as described above, after the first readout, the second readout is performed without initializing the photodiode 121. Therefore, the signal charge component is not cancelled out. In other words, the dark current component is reduced and mainly the signal charge component is extracted.

By performing each of the processes described above, the CMOS image sensor 100 may suppress the dark current component of the pixel signal.

Description of how to obtain the differences between the pixel signals by inverting the orientation of the counting was given above. However, the method of obtaining the differences between the pixel signals is arbitrary and not limited to this. For example, a configuration may be adopted in which the orientation of the counting is one predetermined direction and the sign of the count value (or the difference value) obtained in the previous readout is inverted. In addition, a configuration may be adopted in which each time, the count values are obtained and then the difference is obtained by subtracting the count values from one another.

In addition, the orientation (up or down) of the counting described above is an example of one configuration and may be counted up or counted down as long as the whole configuration conforms thereto.

In addition, a configuration was described above in which the readout process of the P-phase and the D-phase is repeated two times. However, the number of times the process is repeated is arbitrary and the process may be repeated three or more times. Even in this case, the direction of the counting may be the inverse orientation in relation to the previous time. By repeating the readout process an even larger number of times, it is possible to suppress the influence of unexpected errors which may occur in the readout process each time. Therefore, it is possible to realize the suppression of a dark current component of the pixel signal in a more stable manner.

In addition, it may not be necessary to perform the plurality of readout processes to obtain the differences between the signal levels within one horizontal synchronization period as described above. Furthermore, a configuration may be adopted in which the readout of the signal charge that is accumulated in the photodiode is performed on the n-th readout.

Furthermore, as described above, when adopting a signal readout to which the present disclosure is applied, it may be necessary to perform the readout a plurality of times and the number of processes is more than that of the related art. Therefore, in order to complete all of the readout processes within one horizontal synchronization period, a configuration may be adopted in which the speed of the operation clock is increased (the frequency is increased) when performing the signal readout to which the present disclosure is applied. In addition, for example, in a mode for imaging when the pixels are dark, there is a case in which the frame rate is lowered in order to lengthen the exposure time. A configuration may be adopted in which performing the signal readout to which the present disclosure is applied may be carried out only in such a mode. In other words, when performing the signal readout to which the present disclosure is applied, the frame rate may be lowered.

Parallel Readout

Figure 11:
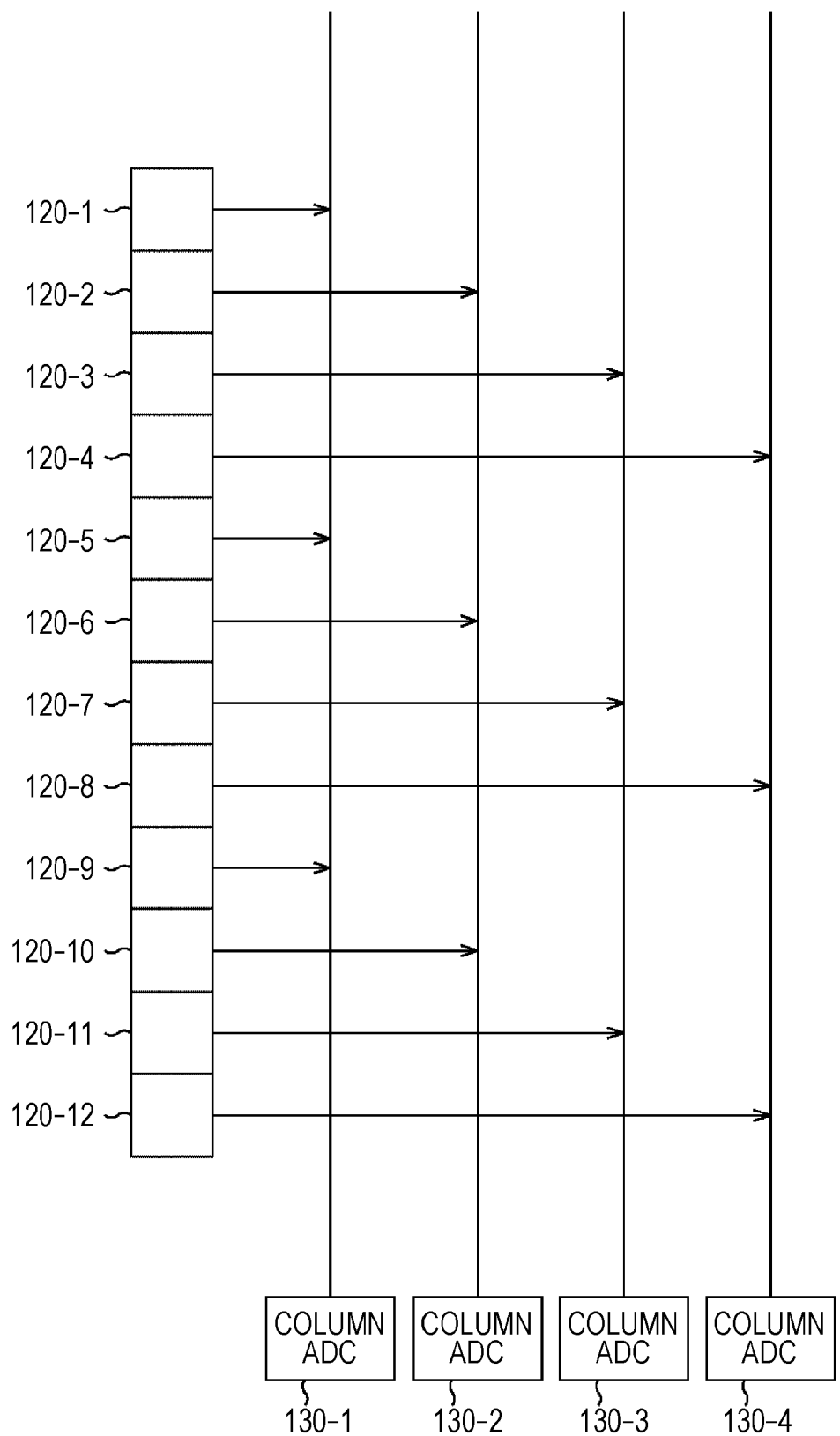
FIG. 11 is a diagram illustrating another configuration example of a column ADC.
Figure 12:
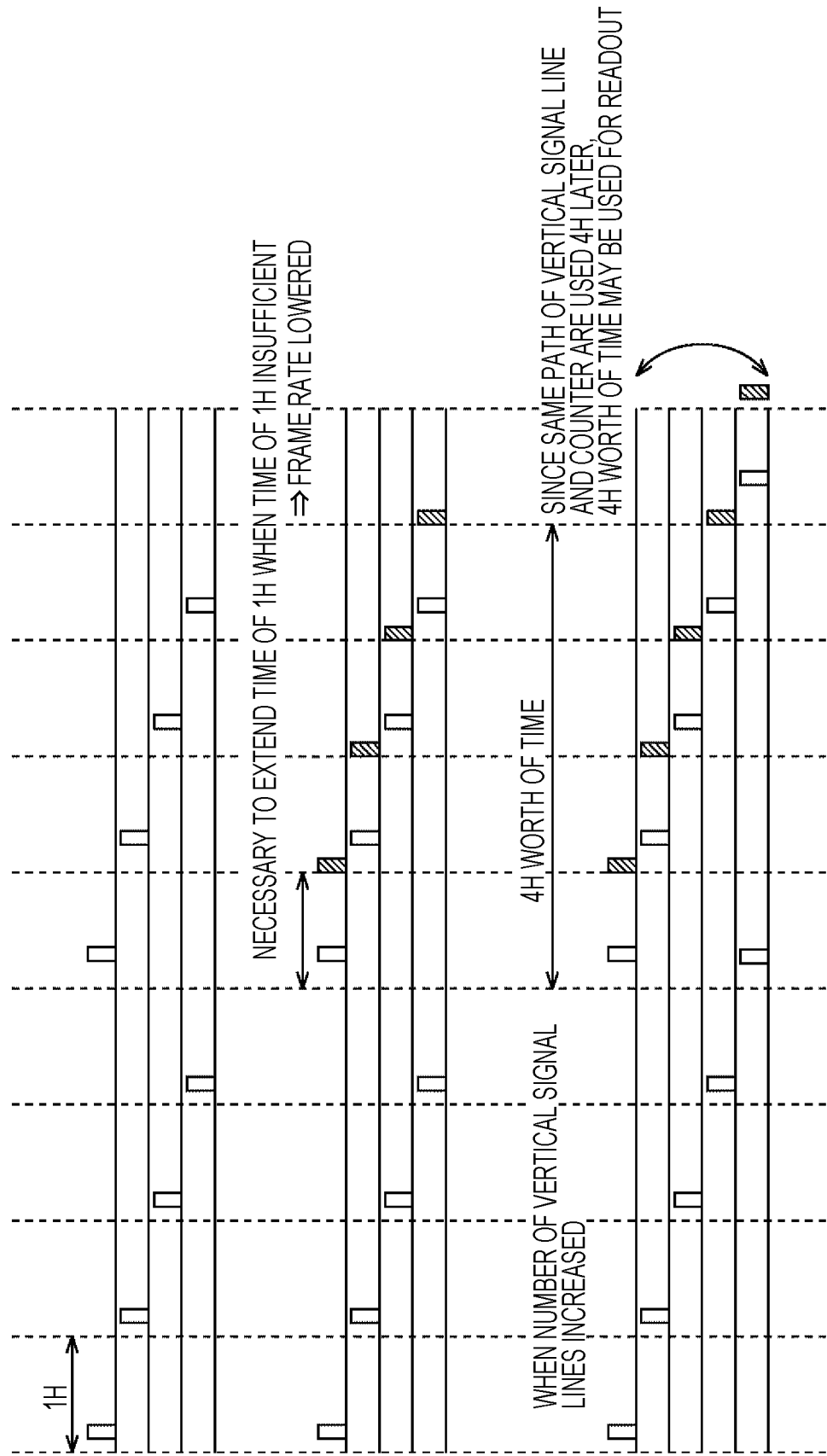
FIG. 12 is a diagram illustrating another example of a signal readout.

In addition, as shown in FIG. 11, a configuration may be adopted in which a plurality of column ADCs are provided in relation to one pixel column. In the example shown in FIG. 11, four column ADCs (the column ADC 130-1 to the column ADC 130-4) are provided in relation to one pixel column (the pixel 120-1 to the pixel 120-12). By adopting such a configuration, as shown in FIG. 12, since the same path of the vertical signal line and the counter are used 4H later, 4H worth of time may be used for the readout. Accordingly, it is possible to suppress the dark current component of the pixel signal without reducing the frame rate.

2. Second Embodiment

Imaging Apparatus

Figure 13:
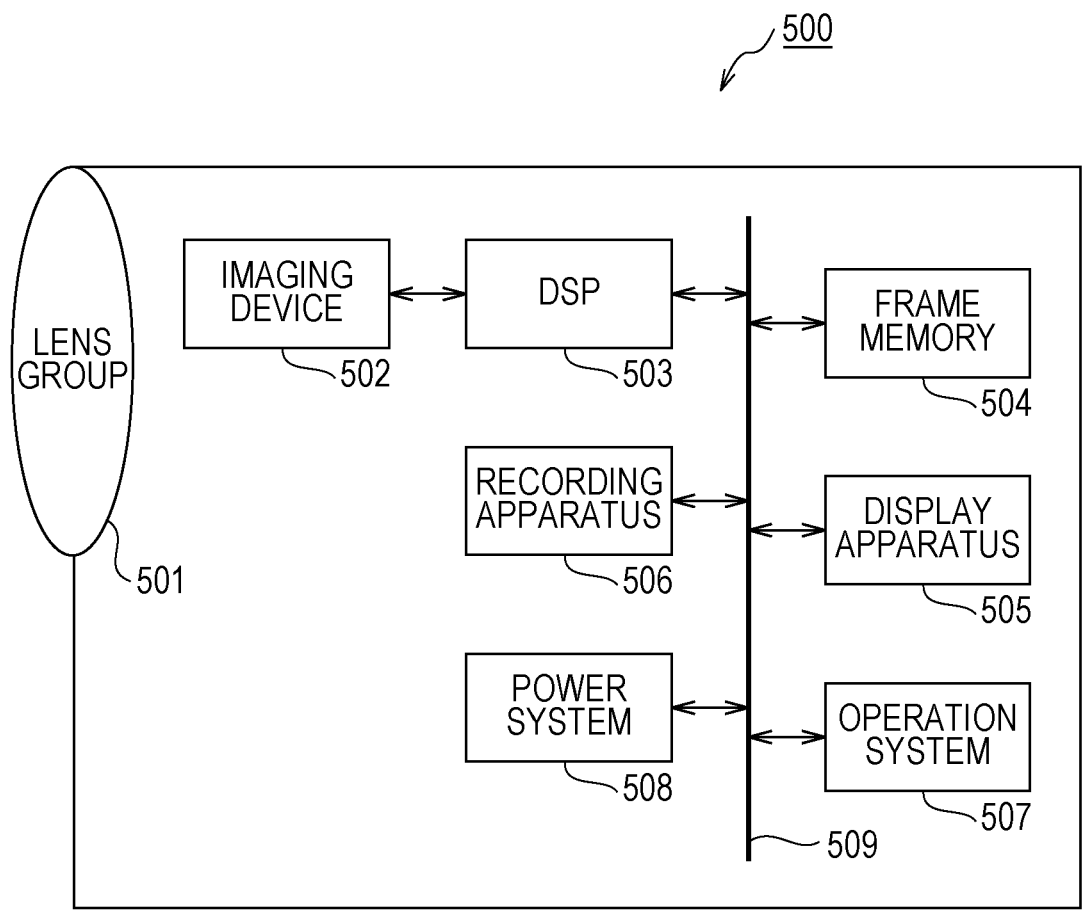
FIG. 13 is a block diagram illustrating a principal configuration example of an imaging apparatus.

FIG. 13 is a diagram that shows a principal configuration example of an imaging apparatus to which the present technology is applied. An imaging apparatus 500 shown in FIG. 13 is an apparatus which images a subject and outputs an image of the subject as an electrical signal. As shown in FIG. 13, the imaging apparatus 500 includes an optical system containing a lens group 501 and the like, an imaging device 502, a Digital Signal Processor (DSP) 503 which serves as the camera signal processing unit, frame memory 504, a display apparatus 505, a recording apparatus 506, an operation system 507, a power system 508 and the like.

Furthermore, the DSP 503, the frame memory 504, the display apparatus 505, the recording apparatus 506, the operation system 507 and the power system 508 are interconnected via a bus line 509.

The lens group 501 takes in incident light (image light) from the subject and forms an image on an imaging surface of the imaging device 502. The imaging device 502 converts the amount of incident light forming an image on the imaging surface by pixel unit using the lens group 501 into an electrical signal and outputs the electrical signal as a pixel signal. It is possible to use a solid state imaging apparatus such as the CMOS image sensor 100 according to the embodiment described above as the imaging device 502. The DSP 503 performs the camera signal processing of the related art.

The display apparatus 505 is formed from a liquid crystal display apparatus or an organic electro luminescence (EL) display apparatus and displays the moving picture or still picture imaged by the imaging device 502. The recording apparatus 506 records the moving picture or the still picture imaged by the imaging device 502 onto a recording medium such as a video tape or a DVD (Digital Versatile Disc).

The operation system 507 gives operation commands relating to the various functions implemented by the present imaging apparatus on the basis of operation by the user. The power system 508 supplies the various types of power supplies that serve as the operation power supplies of the DSP 503, the frame memory 504, the display apparatus 505, the recording apparatus 506 and the operation system 507 to these supply targets as appropriate.

The imaging apparatus 500 is applied to video cameras, digital still cameras, and further, to camera modules for mobile devices such as mobile telephones. By using the CMOS image sensor 100 described above as the imaging device 502, the imaging apparatus 500 can suppress the dark current component of the pixel signal and can obtain an imaged image of a higher image quality.

Furthermore, the imaging apparatus to which the present disclosure is applied is not limited to the configurations described above and may be of another configuration. For example, the imaging apparatus is not limited to being a digital still camera, a video camera or the like and may also be an information processing apparatus that includes an imaging function such as a mobile telephone, a smart phone, a tablet device or a personal computer. In addition, the imaging apparatus may also be a camera module which is used mounted to another information processing apparatus (or is installed as an embedded device).

3. Third Embodiment

Computer

The series of processes described above may be executed using hardware and may also be executed using software. In a case in which the series of processes is executed using software, the program configuring the software is installed on a computer. Here, the definition of "computer" includes a computer embedded in dedicated hardware, and an ordinary personal computer or the like which is capable of executing the various functions due to having various programs installed thereon.

FIG. 14 is a block diagram showing a configuration example of the hardware of the computer which executes the series of processes described above using a program.

In the computer 600 shown in FIG. 14, a Central Processing Unit (CPU) 601, Read Only Memory (ROM) 602, and Random Access Memory (RAM) 603 are interconnected via a bus 604.

An input-output interface 610 is also connected to the bus 604. The input-output interface 610 is connected to an input unit 611, an output unit 612, a storage unit 613, a communication unit 614, and a drive 615.

The input unit 611 is formed from a keyboard, a mouse, a microphone, a touch panel, an input terminal or the like. The output unit 612 is formed from a display, a speaker, an output terminal or the like. The storage unit 613 is formed from a hard disk, a ram disk, non-volatile memory or the like. The communication unit 614 is formed from a network interface, for example. The drive 615 drives a removable medium 621 such as a magnetic disk, an optical disc, a magneto-optical disc or semiconductor memory.

In the computer 600 configured as described above, the series of processes described above are performed by the CPU 601, for example, loading the program stored in the storage unit 613 into the RAM 603 via the input-output interface 610 and the bus 604, and executing the loaded program. In the ram 603, the CPU 601 stores data and the like which may be necessary for executing the various processes.

The program executed by the computer (the CPU 601), for example, may be applied by recording the program onto a removable media 621 as a packaged media or the like. In addition, it is possible to provide the program via a wired or wireless transmission medium such as a local area network, the Internet, or a digital satellite broadcast.

In the computer, it is possible to install the program into the storage unit 613 via the input-output interface 610 by mounting the removable medium 621 into the drive 615. In addition, it is possible to install the program into the storage unit 613 by receiving the program using the communication unit 614 via a wired or wireless transmission medium. Additionally, it is possible to pre-install the program into the ROM 602 or the storage unit 613.

Furthermore, the processes of the program which the computer executes may be performed in the time series order described in the present specification, and may also be performed in parallel or at a necessary timing such as when a call is performed.

In addition, in the present specification, the steps that define the program recorded on the recording medium naturally include processes that are performed in the described time series order. However, the processes in the steps are not necessarily executed in time series order and may also be executed in parallel or individually.

In addition, the term "system" in the present specification refers to an assembly of a plurality of components (apparatuses, modules (parts) and the like), and it is not an issue as to whether or not all of the components are contained within the same housing. Accordingly, a plurality of apparatuses which are stored in separate housings and connected via a network, and a single apparatus in which a plurality of modules are stored within a single housing are both systems.

In addition, a configuration described above as one apparatus (or processing unit) may be divided so as to be configured as a plurality of apparatuses (or processing units). Conversely, a configuration described above as a plurality of apparatuses (or processing units) may be combined so as to be configured as one apparatus (or processing unit). In addition, naturally, a configuration other than those described above may be added to the configuration of each apparatus (or processing unit). Furthermore, as long as the configurations and operations of the system as a whole are basically the same, a portion of a configuration of a certain apparatus (or processing unit) may be included in the configuration of another apparatus (or another processing unit).

Detailed description was given above of the favorable embodiments of the present disclosure with reference to the appended drawings. However, the technical scope of the present disclosure is not limited to the examples therein. It is clear to a person skilled in the art of the present disclosure that various modifications and corrections and examples may be made within the technical scope disclosed in the claims. Naturally, such modifications and corrections are understood to fall within the technical scope of the present disclosure.

For example, the present technology may also adopt a cloud computing configuration in which a single function is shared by a plurality of apparatuses via a network and processed by the collaboration of the plurality of apparatuses.

In addition, each of the steps described in the flowcharts above may be executed by a single apparatus, and may also be shared by a plurality of apparatuses and executed.

Furthermore, in a case in which a plurality of processes are contained in one step, the plurality of processes contained in that one step may be executed by a single apparatus, and may also be shared by a plurality of apparatuses and executed.

Furthermore, the present technology may adopt configurations such as the following.

(1) An imaging device includes a readout unit which reads out an amount of charge accumulated in a floating diffusion that accumulates a charge transmitted from a light receiving unit that photoelectrically converts incident light as a signal level; a readout control unit which controls the readout unit to perform, a plurality of times, a readout operation to read out the amount of charge of a P-phase and a D-phase accumulated in the floating diffusion; and a calculation unit which is controlled by the readout control unit and obtains differences between the signal levels which are obtained using the readout operation that is performed a plurality of times.

(2) The imaging device according to any one of (1) to (15), in which the readout control unit causes the plurality of readout operations to be performed within one horizontal synchronization period.

(3) The imaging device according to any one of (1) to (15), in which the readout control unit causes the readout operation to be performed two times within the one horizontal synchronization period.

(4) The imaging device according to any one of (1) to (15), in which the readout control unit causes a first readout operation to be performed, and subsequently causes a second readout operation to be performed without initializing the light receiving unit.

(5) The imaging device according to any one of (1) to (15), in which the readout unit includes a reset transistor that controls initialization of the floating diffusion, and a readout transistor that controls movement of a charge from the light receiving unit to the floating diffusion.

(6) The imaging device according to any one of (1) to (15), in which, in each of the readout operations, the readout control unit turns on the reset transistor, initializes the floating diffusion, causes a readout of an amount of charge of a P-phase to be performed, and subsequently turns on the readout transistor, causes a charge of the light receiving unit to be moved to the floating diffusion and causes the readout of an amount of charge of a D-phase to be performed.

(7) The imaging device according to any one of (1) to (15), in which the readout control unit causes the readout operation to be performed a plurality of times, subsequently turns on the reset transistor and the readout transistor and initializes the light receiving unit and the floating diffusion.

(8) The imaging device according to any one of (1) to (15), in which the readout unit further includes an amplification transistor that amplifies an amount of charge accumulated in the floating diffusion and converts the amplified charge into the signal level, and a select transistor that controls supply of the signal level to the calculation unit, and in which the readout control unit turns on the select transistor during the plurality of readout operations.

(9) The imaging device according to any one of (1) to (15), in which the readout control unit lowers a frame rate in comparison to a case in which the readout operation is performed one time, and causes the readout operation to be performed a plurality of times.

(10) The imaging device according to any one of (1) to (15), in which the calculation unit, in relation to a signal level obtained using a first readout operation, uses 0 as an initial value and counts the signal level; in relation to a signal level obtained using a second readout operation, uses a count value of the signal level obtained using the first readout operation as an initial value, and counts the signal level in an opposite orientation from the previous readout operation; and in relation to a signal level obtained using a third readout operation onward, uses a difference value of the signal levels obtained until the previous readout operation as an initial value, and counts the signal level in an opposite orientation from the previous readout operation.

(11) The imaging device according to any one of (1) to (15), in which the calculation unit, in relation to a signal level obtained using a first readout operation, uses 0 as an initial value and counts the signal level; in relation to a signal level obtained using a second readout operation, inverts a sign of a count value of a signal level obtained using the first readout operation, uses the inverted count value as an initial value, and counts the signal level in a same orientation as the previous readout operation; and in relation to a signal level obtained using a third readout operation onward, inverts a sign of a difference value of the signal levels obtained until the previous readout operation, uses the inverted difference value as an initial value, and counts the signal level in a same orientation as the previous readout operation.

(12) The imaging device according to any one of (1) to (15), in which the calculation unit obtains a difference between a signal level obtained by the readout of the P-phase and a signal level obtained by the readout of the D-phase as a signal level obtained using the readout operation.

(13) An imaging apparatus includes: an imaging device which includes a readout unit which reads out an amount of charge accumulated in a floating diffusion that accumulates a charge transmitted from a light receiving unit that photoelectrically converts incident light as a signal level, a readout control unit which controls the readout unit to perform, a plurality of times, a readout operation to read out the amount of charge of a P-phase and a D-phase accumulated in the floating diffusion, and a calculation unit which is controlled by the readout control unit and obtains differences between the signal levels which are obtained using the readout operation that is performed a plurality of times; and an image processing unit which performs image processing on an image of a subject that is photoelectrically converted in the imaging device.

(14) A semiconductor device includes a readout control unit which controls a readout unit provided on another semiconductor substrate, which reads out an amount of charge accumulated in a floating diffusion that accumulates a charge transmitted from a light receiving unit that photoelectrically converts incident light as a signal level, and causes a readout operation to read out the amount of charge of a P-phase and a D-phase accumulated in the floating diffusion to be performed a plurality of times; and a calculation unit which is controlled by the readout control unit and obtains differences between the signal levels which are obtained using the readout operation that is performed a plurality of times.

(15) A readout method which reads out a signal level corresponding to an amount of charge accumulated in a floating diffusion that accumulates a charge transmitted from a light receiving unit that photoelectrically converts incident light from an imaging device, the method includes performing, a plurality of times, a readout operation to read out the signal level corresponding to the amount of charge of a P-phase and a D-phase accumulated in the floating diffusion that accumulates the charge transmitted from the light receiving unit that photoelectrically converts incident light; and obtaining differences between the signal levels which are obtained using the readout operation that is performed a plurality of times.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging device comprising:
 a CPU configured to:
  control readout circuitry to read out a signal level based on an amount of charge accumulated in a floating diffusion that is selectively connected to a light receiving unit that photoelectrically converts incident light;
  control the readout circuitry to read out the signal level of a P-phase a plurality of times within one predetermined period and to read out the signal level of a D-phase a plurality of times within the one predetermined period; and
  obtain differences between the signal levels that are read out by the readout circuitry during the one predetermined period by:
   obtaining a first value corresponding to a difference between a first one of the signal levels of the P-phase and a first one of the signal levels of the D-phase;
   obtaining a second value corresponding to a difference between a second one of the signal levels of the P-phase and a second one of the signal levels of the D-phase; and
   obtaining a difference between the first value and the second value.

2. The imaging device according to claim 1, wherein the one predetermined period is one horizontal synchronization period.

3. The imaging device according to claim 2, wherein the CPU is configured to cause the readout circuitry to read out the signal level of the P-phase two times within the one horizontal synchronization period and to read out the signal level of the D-phase two times within the one horizontal synchronization period.

4. The imaging device according to claim 3, wherein the CPU is configured to cause the readout circuitry to:
perform a first readout operation comprising:
reading out the signal level of the P-phase a first time and
reading out the signal level of the D-phase a first time, and
then perform a second readout operation comprising:
reading out the signal level of the P-phase a second time and
reading out the signal level of the D-phase a second time,
wherein the light receiving unit is not initialized between the performing of the first readout operation and the performing of the second readout operation.

5. The imaging device according to claim 1, wherein the readout circuitry includes:
a reset transistor that controls initialization of the floating diffusion, and
a readout transistor that controls movement of a charge from the light receiving unit to the floating diffusion.

6. The imaging device according to claim 5, wherein the CPU is configured to control performance of a readout operation, each performance of the readout operation comprising, in order:
turning on the reset transistor, thereby initializing the floating diffusion,
causing the readout circuitry to read out the signal level of the P-phase,
turning on the readout transistor, thereby causing a charge of the light receiving unit to be moved to the floating diffusion, and
causing the readout circuitry to read out the signal level of the D-phase.

7. The imaging device according to claim 5, wherein the CPU causes the readout operation to be performed a plurality of times within the one predetermined period, subsequently turns on the reset transistor and the readout transistor and initializes the light receiving unit and the floating diffusion.

8. The imaging device according to claim 5, wherein the readout circuitry further includes:
an amplification transistor that amplifies an amount of charge accumulated in the floating diffusion and converts the amplified charge into the signal level, and
a select transistor that controls supply of the signal level, and
wherein the CPU is configured to turn on the select transistor during the readout of the signal level of the P-phase a plurality of times within the one predetermined period and during the readout of the signal level of the D-phase a plurality of times within the one predetermined period.

9. The imaging device according to claim 1, wherein the CPU is configured to lower a frame rate in comparison to a case in which the signal level of the P-phase and the signal level of the D-phase are read out only once each within the one predetermined period.

10. The imaging device according to claim 1, wherein the CPU is configured to obtain the differences between the signal levels read out by the readout circuitry during the one predetermined period by:
obtaining a first count value by counting from 0 in a first direction by an amount corresponding to a first one of the signal levels;
obtaining a second count value by counting from the first count value in a second direction by an amount corresponding to a second one of the signal levels;
obtaining a third count value by counting from the second count value in the second direction by an amount corresponding to a third one of the signal levels; and
obtaining a fourth count value by counting from the third count value in the first direction by an amount corresponding to a fourth one of the signal levels.

11. The imaging device according to claim 1, wherein the CPU is configured to obtain the differences between the signal levels read out by the readout circuitry during the one predetermined period by:
obtaining a first count value by counting from 0 in a first direction by an amount corresponding to a first one of the signal levels;
obtaining a second count value by counting from the first count value in a second direction by an amount corresponding to a second one of the signal levels;
obtaining a third count value by inverting a sign of the second count value and counting therefrom in the first direction by an amount corresponding to a third one of the signal levels; and
obtaining a fourth count value by counting from the third count value in the second direction by an amount corresponding to a fourth one of the signal levels.

12. The imaging device of claim 1, wherein the CPU is configured to:
obtain the first value by counting in a first direction based on the first one of the signal levels of the P-phase, counting in a second direction based on the first one of the signal levels of the D-phase, and storing a counting result as the first value, and
obtain the second value by counting in the first direction based on the second one of the signal levels of the P-phase, counting in the second direction based on the second one of the signal levels of the D-phase, and storing a counting result as the second value.

13. An imaging apparatus comprising:
an imaging device which includes a CPU configured to:
control readout circuitry to read out a signal level based on an amount of charge accumulated in a floating diffusion that is selectively connected to a light receiving unit that photoelectrically converts incident light;
control the readout circuitry to read out the signal level of a P-phase a plurality of times within one predetermined period and to read out the signal level of a D-phase a plurality of times within the one predetermined period; and
obtain differences between the signal levels that are read out by the readout circuitry during the one predetermined period by:
obtaining a first value corresponding to a difference between a first one of the signal levels of the P-phase and a first one of the signal levels of the D-phase;
obtaining a second value corresponding to a difference between a second one of the signal levels of the P-phase and a second one of the signal levels of the D-phase; and
obtaining a difference between the first value and the second value; and perform image processing on an image of a subject that is photoelectrically converted in the imaging device.

14. A semiconductor device comprising:
a CPU configured to:
control readout circuitry provided on another semiconductor substrate, the readout circuitry being configured to read out a signal level based on an amount of charge accumulated in a floating diffusion that is selectively connected to a light receiving unit that photoelectrically converts incident light, the CPU being configured to cause the readout circuitry to read out the signal level of a P-phase a plurality of times within one predetermined period and to read out the signal level of a D-phase a plurality of times within the one predetermined period; and
obtain differences between the signal levels that are read out by the readout circuitry during the one predetermined period by:
obtaining a first value corresponding to a difference between a first one of the signal levels of the P-phase and a first one of the signal levels of the D-phase;
obtaining a second value corresponding to a difference between a second one of the signal levels of the P-phase and a second one of the signal levels of the D-phase; and
obtaining a difference between the first value and the second value.

15. A method of controlling readout operations in an imaging device comprising a CPU, the method comprising:
controlling readout circuitry that reads out a signal level corresponding to an amount of charge accumulated in a floating diffusion that is selectively connected to a light receiving unit that photoelectrically converts incident light:
causing the readout circuitry to read out the signal level of a P-phase a plurality of times within one predetermined period and to read out the signal level of a D-phase a plurality of times within the one predetermined period; and
obtaining differences between the signal levels that are read out by the readout circuitry during the one predetermined period by:
obtaining a first value corresponding to a difference between a first one of the signal levels of the P-phase and a first one of the signal levels of the D-phase;
obtaining a second value corresponding to a difference between a second one of the signal levels of the P-phase and a second one of the signal levels of the D-phase; and
obtaining a difference between the first value and the second value.

16. An imaging device comprising:
a CPU configured to:
control a readout circuitry which reads out an amount of charge accumulated in a floating diffusion that accumulates a charge transmitted from a light receiving unit that photoelectrically converts incident light as a signal level;
control the readout circuitry to perform, a plurality of times, a readout operation to read out the amount of charge of a P-phase and a D-phase accumulated in the floating diffusion; and
obtain differences between the signal levels which are obtained using the readout operation that is performed a plurality of times,
wherein the CPU is further configured to:
in relation to a signal level obtained using a first readout operation, use 0 as an initial value and count the signal level;
in relation to a signal level obtained using a second readout operation, invert a sign of a count value of a signal level obtained using the first readout operation, use the inverted count value as an initial value, and count the signal level in a same orientation as the first readout operation; and
in relation to a signal level obtained using a third readout operation onward, invert a sign of a difference value of the signal levels obtained in a previous readout operation, use the inverted difference value as an initial value, and count the signal level in a same orientation as the previous readout operation.

17. An imaging device comprising:
a CPU configured to:
control a pixel circuit including a light sensor to convert incident light into charge;
control a scanning circuit to cause the pixel circuit to output at least two signal pairs during one predetermined period, each of the signal pairs including a reset signal and a light-dependent signal; and
control an analog-to-digital converter to receive the signal pairs, and output a digital value corresponding to a difference between a pixel value of each of the signal pairs, the pixel value for each of the signal pairs corresponding to a difference between the reset signal thereof and the light-dependent signal thereof,
wherein the CPU is further configured to control the analog-to-digital converter to obtain the digital value by:
for a first one of the signal pairs, counting from an initial value of 0 according to a first counting pattern; and
for an $n^{th}$ one of the signal pairs (n>1), counting from an initial value equal to a count value of an $(n-1)^{th}$ one of the signal pairs according to a counting pattern opposite to a counting pattern used for the $(n-1)^{th}$ one of the signal pairs.

18. The imaging device of claim 17,
wherein the CPU is further configured to control the analog-to-digital converter to obtain the digital value by:
for a first one of the signal pairs, counting from an initial value of 0 according to a first counting pattern; and
for an $n^{th}$ one of the signal pairs (n>1), inverting a sign of a count value of an $(n-1)^{th}$ one of the signal pairs and counting from an initial value equal to the inverted count value of the $(n-1)^{th}$ one of the signal pairs according to the first counting pattern.

19. An imaging device comprising:
a CPU configured to:
control readout circuitry to read out a signal level based on an amount of charge accumulated in a floating diffusion that is selectively connected to a light receiving unit that photoelectrically converts incident light;
control the readout circuitry to read out the signal level of a P-phase a plurality of times within one predetermined period and to read out the signal level of a D-phase a plurality of times within the one predetermined period; and obtain differences between the signal levels that are read out by the readout circuitry during the one predetermined period by:
- obtaining a first count value by counting from 0 in a first direction by an amount corresponding to a first one of the signal levels;
- obtaining a second count value by counting from the first count value in a second direction by an amount corresponding to a second one of the signal levels;
- obtaining a third count value by counting from the second count value in the second direction by an amount corresponding to a third one of the signal levels; and
- obtaining a fourth count value by counting from the third count value in the first direction by an amount corresponding to a fourth one of the signal levels.

* * * * *